(12) United States Patent
Uemura et al.

(10) Patent No.: US 12,411,364 B2
(45) Date of Patent: Sep. 9, 2025

(54) OPTICAL MODULE AND MANUFACTURING METHOD OF OPTICAL MODULE FOR OPTICAL COMMUNICATION

(71) Applicant: Sumitomo Electric Industries, Ltd., Osaka (JP)

(72) Inventors: Hiroshi Uemura, Osaka (JP); Keiji Tanaka, Osaka (JP); Taichi Misawa, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 386 days.

(21) Appl. No.: 18/085,200

(22) Filed: Dec. 20, 2022

(65) Prior Publication Data
US 2023/0194903 A1    Jun. 22, 2023

(30) Foreign Application Priority Data
Dec. 22, 2021   (JP) .................................. 2021-208393

(51) Int. Cl.
*G02F 1/01*    (2006.01)
*C09J 1/00*    (2006.01)
*G02F 1/21*    (2006.01)

(52) U.S. Cl.
CPC .............. *G02F 1/0121* (2013.01); *C09J 1/00* (2013.01); *G02F 1/0102* (2013.01); *G02F 1/212* (2021.01); *G02F 2202/28* (2013.01)

(58) Field of Classification Search
CPC ...... G02F 1/0121; G02F 1/212; G02F 1/0102; G02F 2202/28; C09J 1/00
USPC ......................................................... 359/245
See application file for complete search history.

(56) References Cited

U.S. PATENT DOCUMENTS

| | | |
|---|---|---|
| 2007/0094308 A1 | 4/2007 | Mitchell et al. |
| 2014/0233897 A1 | 8/2014 | Ishikawa et al. |
| 2015/0180580 A1 | 6/2015 | Coult et al. |
| 2017/0094308 A1 | 3/2017 | Haskell et al. |
| 2020/0363585 A1* | 11/2020 | Byrd .................. G02B 6/12004 |

FOREIGN PATENT DOCUMENTS

| | | |
|---|---|---|
| JP | 2013-109311 | 6/2013 |
| JP | 2013-229375 | 11/2013 |
| JP | 2018-189699 A | 11/2018 |

* cited by examiner

*Primary Examiner* — William Choi
(74) *Attorney, Agent, or Firm* — McCarter & English, LLP.; Michael A. Sartori

(57) ABSTRACT

An optical module includes: a housing having a first face and a second face parallel to the first face; a first block fixed to the first face of the housing by a first adhesive; an integrated circuit (IC) fixed to the first block by a second adhesive having a thickness larger than a thickness of the first adhesive; a thermoelectric cooler (TEC) fixed to the second face of the housing; an optical circuit element fixed to the TEC; and an interconnection board mounted on the IC and the optical circuit element, the interconnection board being configured to electrically couple the IC to the optical circuit element. The first block is sandwiched between the housing and the IC. The TEC is sandwiched between the housing and the optical circuit element.

11 Claims, 20 Drawing Sheets

OPTICAL MODULE AND MANUFACTURING METHOD OF OPTICAL MODULE FOR OPTICAL COMMUNICATION

CROSS-REFERENCE TO RELATED APPLICATION

This application claims priority from Japanese Patent Application No. 2021-208393, filed on Dec. 22, 2021, the entire subject matter of which is incorporated herein by reference.

TECHNICAL FIELD

The present disclosure relates to an optical module for optical communication and a method of manufacturing the optical module.

BACKGROUND

Japanese Unexamined Patent Publication No. 2018-189699 describes an optical transmitter. The optical transmitter includes a Mach-Zehnder modulator, a driver IC, and an interconnection board. The interconnection board connects the Mach-Zehnder modulator and the driver IC to each other by flip-chip assembly. The Mach-Zehnder modulator is configured with an optical waveguide made of a semiconductor. The Mach-Zehnder modulator has a ground electrode line and a ground electrode and is of a differential drive type. The driver IC has an open-collector type or open-drain type output system and drives the Mach-Zehnder modulator. The Mach-Zehnder modulator is mounted on a thermoelectric cooler cooling the Mach-Zehnder modulator. The thermoelectric coolers are configured with Peltier devices. The driver IC is mounted on a metal block for radiating heat from the driver IC.

U.S. Patent Application Publication No. 2015/0180580 discloses a modulator driver having first and second output ports, an integrated optical transmitter circuit with a modulator having first and second input ports, first and second termination resistors, and an interconnection bridge assembly including a board. A transmission line of which impedance is controlled is formed on the board. The board has an impedance control unit and a transmission unit including first and second signal lines electrically insulated from each other. The interconnection bridge assembly transmits impedance-controlled differential electrical signals from the modulator driver to the modulator and transmits electrical signals from the modulator to the first and second termination resistors.

SUMMARY

An optical module according to the present disclosure includes: a housing having a first face and a second face parallel to the first face; a first block fixed to the first face of the housing by a first adhesive; an integrated circuit (IC) fixed to the first block by a second adhesive having a thickness larger than a thickness of the first adhesive; a thermoelectric cooler (TEC) fixed to the second face of the housing; an optical circuit element fixed to the TEC; and an interconnection board mounted on the IC and the optical circuit element, the interconnection board being configured to electrically couple the IC to the optical circuit element. The first block is sandwiched between the housing and the IC. The TEC is sandwiched between the housing and the optical circuit element.

A manufacturing method of an optical module according to the present disclosure includes: bonding a first block to a first face of a housing by a first adhesive; mounting a thermoelectric cooler (TEC) on a second face of the housing; preparing a chip module by assembling an integrated circuit (IC) and an optical circuit element on an interconnection board by flip-chip assembly; applying a second adhesive on the first block bonded on the first face of the housing, the second adhesive having a thickness larger than a thickness of the first adhesive; applying a third adhesive on the TEC mounted on the second face of the housing; pressing the IC against the second adhesive and simultaneously pressing the optical circuit element against the third adhesive, after holding the chip module at a predetermined height from one of the first face and the second face; and curing the second adhesive and the third adhesive for bonding the chip module to the first block and the TEC.

DETAILED DESCRIPTION

Figure 1:
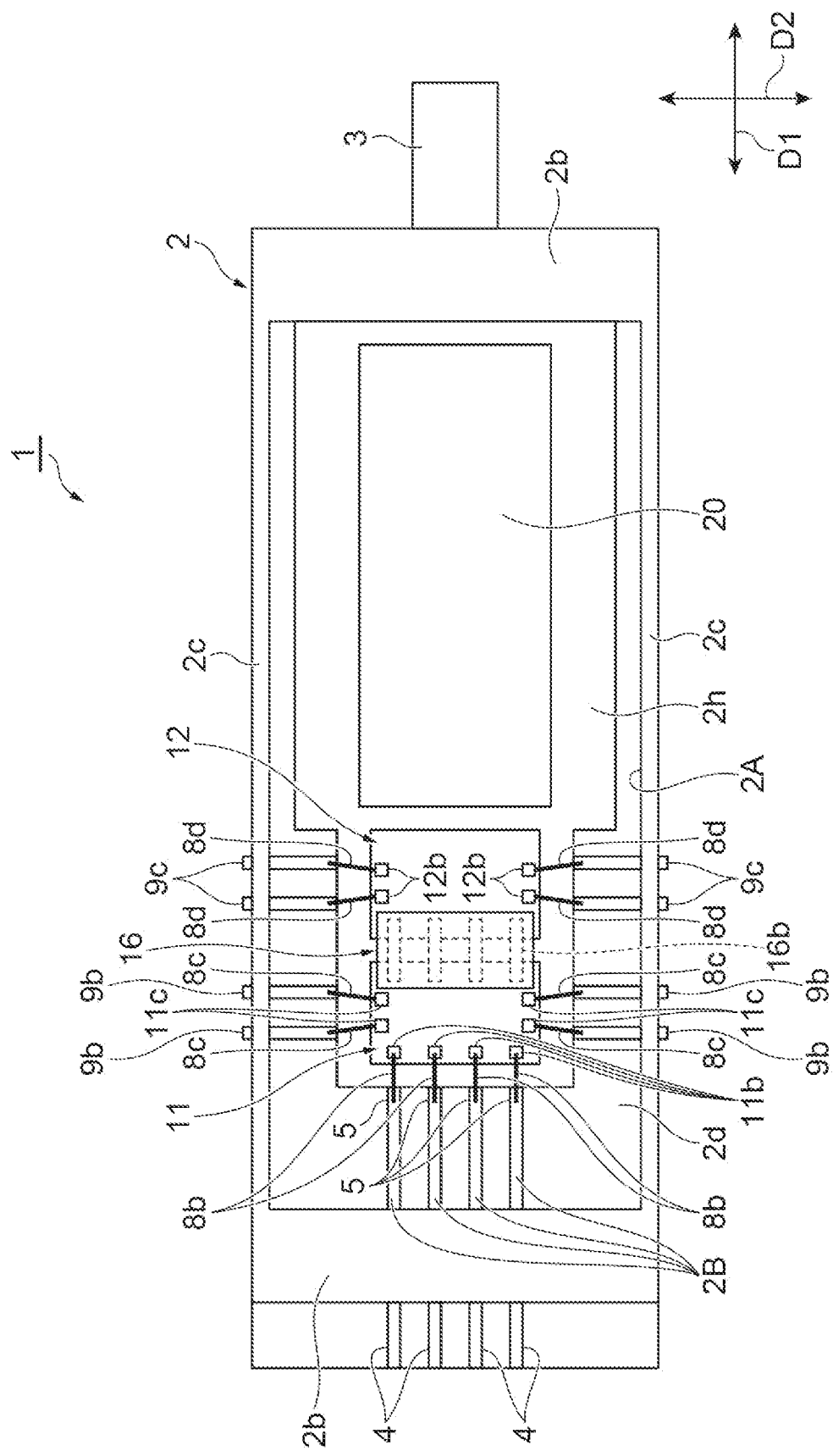
FIG. 1 is a plan view illustrating a structure of an optical module according to an embodiment.

Specific examples of an optical module and a method of manufacturing the optical module according to an embodiment of the present disclosure will be described below with reference to the drawings. It is noted that the present invention is not limited to the following examples, but is intended to include all modifications indicated in the scope of claims and within the scope of equivalents to the scope of claims. In the description of the drawings, the same or corresponding elements are denoted by the same reference numerals, and redundant descriptions are omitted as appropriate. In addition, the drawings may be partially simplified or exaggerated for easy understanding, and the dimensional ratios and the like are not limited to those described in the drawings.

Figure 2:
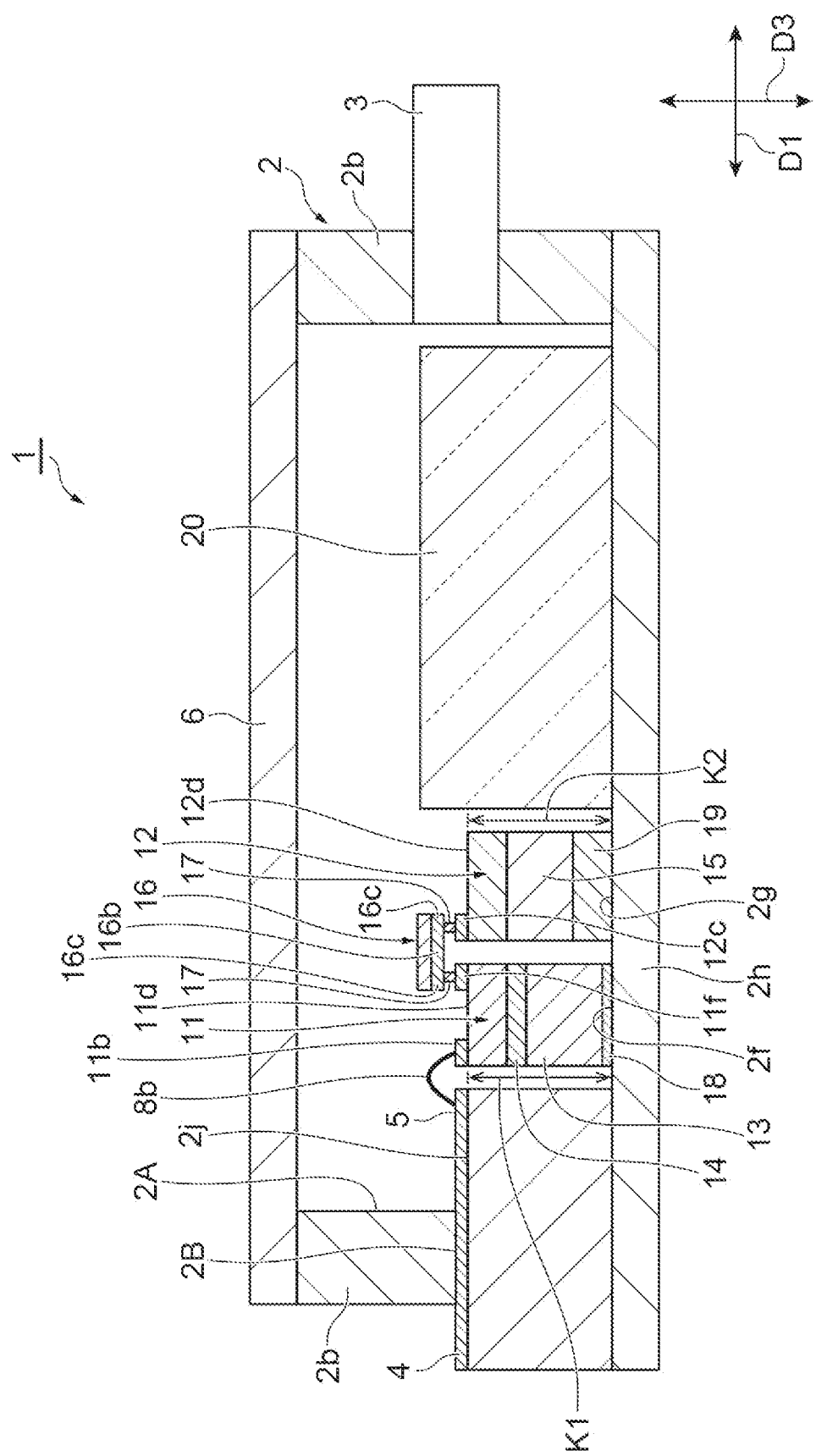
FIG. 2 is a longitudinal sectional view of the optical module according to the embodiment.

FIG. 1 is a plan view illustrating a structure of an optical module 1 according to the present embodiment. FIG. 2 is a cross-sectional view illustrating the optical module 1. As illustrated in FIGS. 1 and 2, the optical module 1 is, for example, an optical transmitter module (TOSA: Transmitter Optical Sub Assembly) including a rectangular parallelepiped housing 2, an optical connector (sleeve) 3, and terminals 4. The housing 2 is made of, for example, a ceramic. The housing 2 extends in a direction D1 that is a longitudinal direction of the housing 2, a direction D2 that is a width direction of the housing 2, and a direction D3 that is a height direction of the housing 2. The direction D1, the direction D2, and the direction D3 are perpendicular to each other. For example, a length of the housing 2 in the direction D1 is larger than a length of the housing 2 in the direction D2 and is larger than a length of the housing 2 in the direction D3.

The housing 2 has a pair of first side walls 2b located at ends in the direction D1, a pair of second side walls 2c located at ends in the direction D2, and a bottom wall 2h located at one end in the direction D3. An internal space 2A of the housing 2 is defined in a region surrounded by the pair of first side walls 2b, the pair of second side walls 2c, and the bottom wall 2h. Components of the optical module 1 are accommodated in the internal space 2A. The optical module 1 further includes a lid 6 that hermetically seals the internal space 2A. The lid 6 is made of, for example, a metal. The opposite side of the bottom wall 2h of the housing 2 is open to the outside, and the internal space 2A is hermetically sealed by bonding the lid 6 to the housing 2 so as to close the opening. For example, the lid 6 is bonded to the housing 2 by seam welding. FIG. 1 illustrates the internal space 2A of the housing 2 with the lid 6 omitted in a plan view from the direction D3. It is noted that, in the direction D3, the direction in which the lid 6 is provided with respect to the bottom wall 2h may be referred to as up, upper side, or upward, and the direction opposite to up, upper side, or upward may be referred to as down, lower side, or downward.

A driver IC 11, an optical modulator 12 which is an optical circuit element, and an optical component 20 are provided in the internal space 2A. The driver IC 11 is an electric circuit formed, for example, on a silicon (Si) board using a SiGe BiCMOS (Bipolar Complementary Metal Oxide Semiconductor) process which amplifies an electric signal supplied from the outside through the terminal 4 to supply the amplified electric signal (driving signal) to the optical modulator 12. The optical modulator 12 is, for example, a Mach-Zehnder interferometer formed on an indium phosphide (InP) board, and modulates an optical signal (CW light) based on an electrical signal supplied from the driver IC 11 to output the modulated optical signal (optical transmission signal). For example, the CW light is supplied from the outside through an optical connector 3. An electrical signal (driving signal) supplied from the driver IC 11 to the optical modulator 12 passes through, for example, the transmission lines formed at an electrical signal output unit of the driver IC 11 and an electrical signal input unit of the optical modulator 12. It is preferable that these transmission lines have characteristic impedance values substantially equal to each other, and the characteristic impedance is, for example, 60Ω in differential impedance. Herein, "substantially equal" denotes that the values may differ within a practically permissible range. For example, the characteristic impedance value may be between 55Ω and 65Ω in differential impedance. The housing 2 has a heat radiation plate (heat radiation member). For example, the bottom wall 2h is configured with the heat radiation plate. A heat radiation plate 2h is made of, for example, copper tungsten (CuW). The heat radiation plate 2h may be made of, for example, a metal material other than CuW. Hereinafter, the bottom wall is also referred to as a heat radiation plate. The driver IC 11 is mounted on the heat radiation plate 2h (heat radiation member) by a second adhesive 14, a first heat radiation block 13, and a first adhesive 18. The first heat radiation block 13 is bonded to a first face 2f of the housing 2 by the first adhesive 18. The first heat radiation block 13 may be made of, for example, metal or ceramic. The first heat radiation block 13 is fixed to the first face 2f of the housing 2 by the first adhesive 18, and the driver IC 11 is fixed to the first heat radiation block 13 by the second adhesive 14. Therefore, the driver IC 11 is fixed to the first face 2f of the housing 2 by the cured first adhesive 18, the first heat radiation block 13, and the cured second adhesive 14. The first heat radiation block 13 is sandwiched between the housing 2 and the driver IC 11 in the direction D3. The second adhesive 14, the first heat radiation block 13, and the first adhesive 18 constitute a heat radiation path for releasing heat (Joule heat) generated by the driver IC 11 during operation to the heat radiation plate 2h.

The first adhesive 18 and the second adhesive 14 are, for example, conductive adhesives. The conductive adhesive is, for example, a silver paste. As will be described later, the first adhesive 18 and the second adhesive 14 are applied in an uncured state, and when heated and cured, a bonded state is formed. The first adhesive 18 and the second adhesive 14 are, for example, in a paste state when applied, but are in a cured state by heating or a passage of time. It is preferable that the first adhesive 18 and the second adhesive 14 have good thermal conductivity. The thermal conductivity in the cured state thereof is, for example, preferably 1 W/(m·K) or more, more preferably 10 W/(m·K) or more. Accordingly, the heat resistance of the second adhesive 14 is suppressed to be low, and heat is efficiently radiated to the heat radiation plate 2h through the first heat radiation block 13, so that the temperature rise of the driver IC 11 can be suppressed due to heat generation. As a result, the operation temperature of the driver IC 11 can be prevented from exceeding the allowable range, and the performance deterioration can be suppressed. The first adhesive 18 and the second adhesive 14 may have electrical conductivity as well as thermal conductivity. As the first adhesive 18 and the second adhesive 14, for example, adhesives containing metal particles or ceramic fillers, silicone-based adhesives, pastes containing metal nanoparticles such as gold, silver, and copper, gold-tin alloy pastes, or solder pastes (cream solders) may be used. Different materials may be used for the first adhesive 18 and the second adhesive 14.

The optical modulator 12 is mounted on the heat radiation plate 2h through a TEC (Thermo Electric Cooler) 15, which is a temperature control element. The TEC 15 is bonded to a second face 2g of the housing 2. For example, the TEC 15 is bonded to the second face 2g of the housing 2 by a fourth adhesive (not illustrated). The second face 2g is a face parallel to the first face 2f. For example, the second face 2g is located on the same plane as the first face 2f. For example, the first face 2f and the second face 2g are formed on the heat radiation plate 2h. For example, a second heat radiation block (second block) 19 is provided between the TEC 15 and the heat radiation plate 2h. However, the second heat radiation block 19 may be provided between the TEC 15 and the optical modulator 12. In addition, the second heat radiation block 19 can be omitted. In addition, the number of the second heat radiation blocks 19 may be plural. The second heat radiation block 19 may be made of, for example, a metal or a ceramic. The TEC 15 is fixed to the second face 2g of the housing 2 by, for example, the fourth adhesive. The optical modulator 12 is fixed to the TEC 15 through the third adhesive. Therefore, the optical modulator 12 is fixed to the first face 2f of the housing 2 by the fourth adhesive, the TEC 15 and the third adhesive. The TEC 15 is sandwiched between the housing 2 and the optical modulator 12 in the direction D3. The TEC 15 releases heat absorbed from the optical modulator 12 to the housing 2 when cooling the optical modulator 12 and supplies heat absorbed from the housing 2 to the optical modulator 12 when heating the optical modulator 12. The temperature of the optical modulator 12 can be maintained to be constant at a predetermined value by the TEC 15 heating or cooling the optical modulator 12 against the change in external temperature.

For example, the optical component 20 includes at least one of lenses, mirrors, beam splitters, and optical filters. The optical component 20 inputs and outputs the optical signals to and from the optical modulator 12. The optical connector 3 is provided on one of the pair of first side walls 2b. The optical connector 3 inputs and outputs the optical signals to and from the optical component 20. The optical connector 3 is, for example, a cylindrical sleeve that holds the optical fiber in the center. The end face of the optical fiber is exposed to the internal space 2A. The optical connector 3 is optically coupled with the optical component 20. For example, the CW light is input from the outside of the housing 2 to the optical modulator 12 through the optical connector 3 and the optical component 20, and the optical transmission signal generated by the optical modulator 12 is output to the outside through the optical component 20 and the optical connector 3. It is noted that, with respect to the directions, sometimes, the direction in which the light is output from the optical connector 3 to the outside of the housing 2 may be referred to as front, front side, or forward, and the direction opposite to front, front side, or forward may be referred to as back, back side, or backward. For example, the light output from the optical connector 3 to back, back side, or backward is input to the optical component 20. In addition, for example, the pair of first side walls 2b has a front-side first side wall and a back-side first side wall in the direction D1. The optical connector 3 is provided on the front-side first side wall. However, these directions are for the convenience of description and do not limit the directions in which the components are arranged.

The housing 2 has electrical wirings 2B. The electrical wiring 2B is, for example, a feed-through electrical wiring that penetrates though the first side wall 2b (rear wall) on the rear side of the housing 2 while maintaining hermeticity (airtightness) of the internal space 2A. A portion of the electrical wirings 2B is exposed to the outside of the housing 2. The plurality of electrical wirings 2B are provided according to the electric signals input to the driver IC 11 and the power supply and the ground required for the operation of the driver IC 11. The terminal 4 for electrical connection with an external device is provided at one end (one end outside the housing 2) of each of the plurality of electrical wirings 2B. For example, the terminals 4 provided on the plurality of electrical wirings 2B are arranged so as to be aligned along the direction D2. A terminal 5 for electrical connection with the driver IC 11 is provided at the other end (one end inside the housing 2) of each of the electrical wirings 2B. For example, the terminals 5 provided on the plurality of electrical wirings 2B are arranged so as to be aligned along the direction D2. The housing 2 has a fifth face 2j on which the electrical wiring 2B is formed, and the terminals 4 and 5 are further provided on the fifth face 2j. The plurality of terminals 4 are electrically coupled to each other through the corresponding plurality of terminals 5 and the electrical wiring 2B. Therefore, electrical signals can be exchanged between the outside and the inside (internal space 2A) of the housing 2 through the electrical wiring 2B. Similarly to the electric signals, a power supply voltage, a ground voltage (ground potential), and the like can be supplied to the driver IC and the optical modulator 12 in the internal space 2A through the electrical wiring 2B. The fifth face 2j is, for example, a face parallel to the first face 2f. Some of the plurality of terminals 5 in the internal space 2A are electrically coupled to corresponding pads 11b of the driver IC 11 through a bonding wires 8b. The electrical wiring 2B electrically coupled to the driver IC 11 may constitute the transmission line for transmitting high-speed electric signals. The driver IC 11 has a third face 11d on the opposite side of the first heat radiation block 13, and the pads 11b are provided on the third face 11d. In addition, a circuit (not illustrated) of the driver IC 11 is also formed on the third face 11d. The third face 11d is also called a circuit face. The driver IC 11 has a substrate face opposite to the circuit face. The substrate face of the driver IC 11 is connected to the first face 2f through the first heat radiation block 13. Therefore, the driver IC 11 is face-up mounted on the first face 2f so that the circuit face faces the opposite of the first face 2f.

The optical module 1 has a plurality of terminals 9b and a plurality of terminals 9c extending along the direction D2 and exposed to the outside of the housing 2. Each of the terminals 9b and 9c is exposed to the outside of the housing 2 on either one of the pair of second side walls 2c. For example, each of a plurality of the terminals 9b is electrically coupled to a pad 11c of the driver IC 11 through a bonding wire 8c. The pads 11c are provided on the third face 11d of the driver IC 11. It is noted that the terminal 9b and the terminal 9c may be provided on only one of the pair of second side walls 2c. The terminals 9b and 9c are used to supply the power supply voltage, the ground potential, or relatively low-speed electrical signals to the driver IC 11.

Each of the plurality of terminals 9c is electrically coupled to pads 12b of the optical modulator 12 through bonding wires 8d. The optical modulator 12 has a fourth face 12d opposite to the TEC 15, and pads 12b and 12c are provided on the fourth face 12d of the optical modulator 12.

In addition, a circuit (not illustrated) of the optical modulator 12 is also formed on the fourth face 12d. The fourth face 12d is also called a circuit face. As described above, the internal space 2A of the optical module 1 is supplied with the electrical signal, the power supply voltage, the ground potential, or the like through the terminal 4 and the terminals 9b and 9c, and the electrical signal, the power supply voltage, and the ground potential are supplied to the driver IC 11 or the optical modulator 12 through the bonding wires 8b, 8c, and 8d.

The optical module 1 has an interconnection board 16 that electrically couples the driver IC 11 and the optical modulator 12 to each other. The board (base material) of the interconnection board 16 may be made of a material transmitting at least a portion of a wavelength range of the visible light. For example, the board (base material) of the interconnection board 16 is made of a glass. As the glass, for example, a soda lime glass, a borosilicate glass, a crystallized glass, and a quartz glass can be used. The main component of the glass is, for example, silicon dioxide ($SiO_2$) and may be a composition containing sodium (Na) or calcium (Ca). It is noted that the board (base material) may be made of a material (for example, silicon (Si)) not transmitting the visible light. It is preferable that the linear expansion coefficient of the interconnection board 16 is adjusted so that the difference from the linear expansion coefficient of the optical modulator 12 is small. Accordingly, the stress generated in a bonding portion between the interconnection board 16 and the optical modulator 12 when each portion is deformed due to the change in temperature is alleviated, and the deterioration of the bonding state and the change in the optical characteristics of the optical modulator 12 can be reduced. For example, when the optical modulator 12 is formed by using an InP compound semiconductor, the linear expansion coefficient is, for example, 4.5 ppm/° C. In consideration that the optical modulator 12 made of, for example, an InP compound semiconductor is controlled at a constant temperature by the TEC 15, it is preferable that the linear expansion coefficient of the interconnection board 16 is in a range of 0 to 4.5 ppm/° C. It is preferable that the thermal conductivity of the interconnection board 16 is, for example, 5 W/(m·K) or less. It is noted that the thermal conductivity of the interconnection board 16 may be less than 3 W/(m·K) or even less than 1 W/(m·K). By allowing the thermal conductivity of the interconnection board 16 to be small, the heat inflow from the driver IC 11 to the optical modulator 12 can be reduced, and the change in the optical characteristics of the optical modulator 12 can be reduced. In addition, for example, the power consumption of the TEC 15 required to compensate for the temperature rise due to the heat inflow can be reduced.

The board of the interconnection board 16 may be made of, for example, a material having a lower thermal conductivity than glass. Moreover, the interconnection board 16 may be made of, for example, a resin. As the resin, for example, polyimide, epoxy, PTFE (polytetrafluoroethylene), or the like can be used. When the interconnection board 16 is made of a resin, the interconnection board 16 can be allowed to be flexible by reducing the thickness of the board (for example, 100 μm or less). Accordingly, when the temperature of the housing 2 changes, the stress generated in the bump connection portion described later can be alleviated by deforming the interconnection board 16, and the electrical connection can be stabilized against the change in temperature. In particular, in the optical module 1, since the structure (lower structure) between the driver IC 11 and the heat radiation plate 2h and the structure (lower structure) between the optical modulator 12 and the heat radiation plate 2h are different from each other, a difference occurs between the displacement of the connection portion of the interconnection board 16 with the driver IC 11 and the displacement of the connection portion of the interconnection board 16 with the optical modulator 12 when the temperature changes. There is a concern that difference may increase the stress applied to each connection. The interconnection board 16 is mounted on the driver IC 11 and the optical modulator 12. An electrical wiring 16b is formed on the interconnection board 16. The electrical wiring 16b is formed of, for example, a metal layer of gold or copper, and may be formed directly on the board of the interconnection board 16 or may be formed on the board of the interconnection board 16 through an insulating film. As the insulating film, for example, silicon dioxide ($SiO_2$) or polyimide may be used.

The electrical wiring 16b may be covered and protected with a passivation film. Pads 16c for connecting to the driver IC 11 or the optical modulator 12 are provided, for example, at both ends of the interconnection board 16. The pads 16c of the interconnection board 16 may be configured as end portions of the electrical wirings 16b or may be configured by providing openings in the passivation film provided thereon. Moreover, surface treatment such as gold plating may be performed on the pads 16c. The face of the interconnection board 16 on which the electrical wiring 16b is formed faces circuit faces (the third face 11d and the fourth face 12d) of the driver IC 11 and the optical modulator 12. Accordingly, the driver IC 11 and the optical modulator 12 are electrically coupled through bumps 17 described later. More specifically, the face of the interconnection board 16 on which the pads 16c are formed faces the heat radiation plate 2h. In addition, the face (circuit face) of the driver IC 11 on which the pads 11b are formed and the face (circuit face) of the optical modulator 12 on which pads 12c are formed face the direction opposite to the heat radiation plate 2h. Therefore, the interconnection board 16 is connected to the driver IC 11 and the optical modulator 12 so that the pads 16c of the interconnection board 16 face the driver IC 11 and the optical modulator 12.

Such a mounting form in which the face of the interconnection board 16 on which the electrical wiring 16b and the pads 16c are formed faces downward (face down) to be connected is sometimes referred to as flip-chip assembly. For example, the transmission line is formed on the interconnection board 16 by the electrical wiring 16b. For example, the transmission line is configured as a coplanar line with four parallel wirings (GSSG wirings) extending along the direction D1. The GSSG wiring is configured with a ground wiring (G), a signal wiring (S), a signal wiring (S), and a ground wiring (G) arranged along the direction D2. The voltage of the ground wiring (G) is set to the ground potential. For example, a drive signal which is a differential signal is transmitted from the driver IC 11 to the optical modulator 12 through two central signal wires S and S. By transmitting the drive signal through the transmission line, the influence of the inductance of the signal wiring can be reduced, so that the frequency characteristics can be improved. It is preferable that the characteristic impedance of the transmission lines of the interconnection board 16 is substantially equal to the characteristic impedance of the transmission lines formed at the electrical signal output unit of the driver IC 11 and the electrical signal input unit of the optical modulator 12. For example, the characteristic impedance of the interconnection board 16 may be adjusted within a relative error range of ±10% of the characteristic impedances of the driver IC 11 and the optical modulator 12. Accordingly, signal reflection occurring at a connection portion of the transmission line between the electrical signal output unit of the driver IC 11 and the interconnection board 16, and at a connection portion of the transmission line between the interconnection board 16 and the electrical signal input unit of the optical modulator 12 can be reduced, and thus, high-quality signal transmission up to higher frequencies can be achieved.

The electrical wiring 16*b* constituting the transmission line may be configured with a single metal layer or may be configured with a plurality of metal layers stacked along the direction D3. For example, when the electrical wiring 16*b* is made of two or more metal layers, the insulating film insulating each metal layer may be formed between the metal layers. It is noted that, when the electrical wiring 16*b* is configured with two metal layers, the transmission line may be configured as, for example, a coplanar line with a ground layer. In the case, for example, the ground layer is formed with the metal layer close to the board (substrate) of the interconnection board 16, and a coplanar line layer is formed with the metal layer far from the interconnection board 16. The insulating film is formed between the ground layer and the coplanar line layer. Therefore, the metal layer that becomes the ground layer is arranged between the metal layer that becomes the coplanar line layer and the board (substrate) of the interconnection board 16. In the coplanar line with the ground layer configured in this manner, the ground layer and the ground wiring provided in the coplanar line layer may be electrically coupled to each other through the through-holes provided in the insulating film.

The interconnection board 16 is arranged so as to straddle the driver IC 11 and the optical modulator 12 in the internal space 2A of the housing 2. For example, when the optical module 1 is viewed from the direction D3, the interconnection board 16 has portions overlapping the driver IC 11 and the optical modulator 12 respectively. The bumps 17 are sandwiched between the interconnection board 16 and the driver IC 11, and between the interconnection board 16 and the optical modulator 12, respectively, in each overlapping portion. The bumps 17 are, for example, gold stud bumps made of gold (Au). Specifically, the bumps 17 are provided between pads 11*f* of the driver IC 11 and the pads 16*c* of the interconnection board 16, and between the pads 12*c* of the optical modulator 12 and the pads 16*c* of the interconnection board 16, respectively. More specifically, the pad 16*c* is formed at one end of each of the four electrical wirings constituting the GSSG wiring described above. The pads 16*c* at one end thereof are connected to the driver IC 11 through the bumps 17, respectively. In addition, the pad 16*c* is formed at the other end of each of the four electrical wirings. The pads 16*c* at the other ends are connected to the optical modulator 12 through the bumps 17, respectively.

For example, the difference between a first distance K1 between the first face 2*f* of the housing 2 and the third face 11*d* of the driver IC 11, and a second distance K2 between the first face 2*f* and the fourth face 12*d* of the optical modulator 12 is 50 μm or less. The value of the difference between the first distance K1 and the second distance K2 may be, for example, 40 μm or less. In addition, the value of the difference may be 30 μm or less or may be 20 μm or less. Furthermore, the value of the difference may be 10 μm or less. It is noted that, when the third face 11*d* is inclined, for example, by about 1° to 2° with respect to the first face 2*f*, the first distance K1 is, for example, the shortest distance between the first face 2*f* and the third face 11*d*. In addition, when the fourth face 12*d* is inclined, for example, by about 1° to 2° with respect to the first face 2*f*, the second distance K2 is, for example, the shortest distance between the first face 2*f* and the fourth face 12*d*.

As described in detail later, the difference between the first distance K1 and the second distance K2 can be allowed to be small by pressing the driver IC 11 against the second adhesive 14 before the second adhesive 14 which is thicker than the first adhesive 18 is cured. In the direction D1, the distance between the driver IC 11 and the optical modulator 12 (the shortest distance or gap between the edge (end face) of the driver IC 11 on the side of the optical modulator 12 and the edge (end face) of the optical modulator 12 on the side of the driver IC 11), for example, may be, 100 μm or more, may be 200 μm or more, or may be 300 μm or more. By allowing the distance between the driver IC 11 and the optical modulator 12 to be large, the inclination of the interconnection board 16 with respect to the first face 2*f* of the housing 2 caused by the difference between the first distance K1 and the second distance K2 can be reduced. Further, by allowing the distance to be large, the thermal resistance of the interconnection board 16 between the driver IC 11 and the optical modulator 12 is reduced, and the heat inflow from the driver IC 11 to the optical modulator 12 can be reduced.

Figure 3:
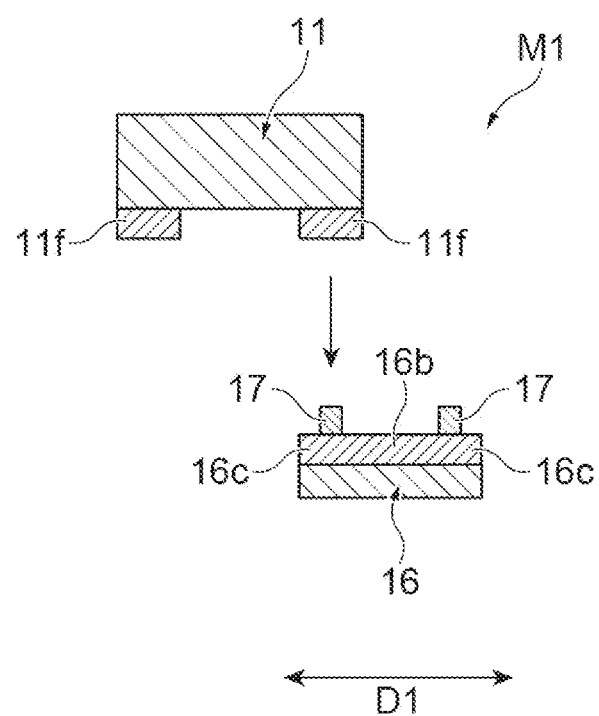
FIG. 3 is a view illustrating a process of a method of manufacturing the optical module according to the embodiment.

Next, a method of manufacturing the optical module according to the embodiment will be described. Hereinafter, a method of assembling the above-described optical module 1 will be described. First, as illustrated in FIG. 3, a chip module M1 is prepared by flip-chip assembling the driver IC 11 on the interconnection board 16 arranged upward on an assembly jig (not illustrated) (the process of preparing the chip module). Specifically, the driver IC 11 is assembled on the interconnection board 16 in which the bumps 17 are formed on the pads 16*c* by flip-chip assembly. At this time, the pads 11*f* of the driver IC 11 are bonded to the bumps 17. The bonding between the bumps 17 and the pads 11*f* is performed, for example, by ultrasonic bonding or thermocompression bonding. It is noted that the bumps 17 may be formed on the pads 11*f* of the driver IC 11 and may be bonded to the pads 16*c* of the interconnection board 16. Since the bonding between the bumps 17 and the pads 11*f*, and the bonding between the bumps 17 and the pads 16*c* have a bonding strength enough to maintain the connection state, for example, after the flip-chip assembly, the upper face of the driver IC 11 is prevented from being inclined with respect to the upper face of the interconnection board 16, when the two upper faces are connected to each other with the bumps 17. However, in contrast with such an inclination, for example, a space around the bumps 17 between the pads 11*f* and 16*c* may be filled with an underfill resin to reinforce the bonding (bump bonding) by the bumps 17. Accordingly, for example, an increase in inclination due to the weight of the driver IC 11 can be suppressed.

Figure 16:
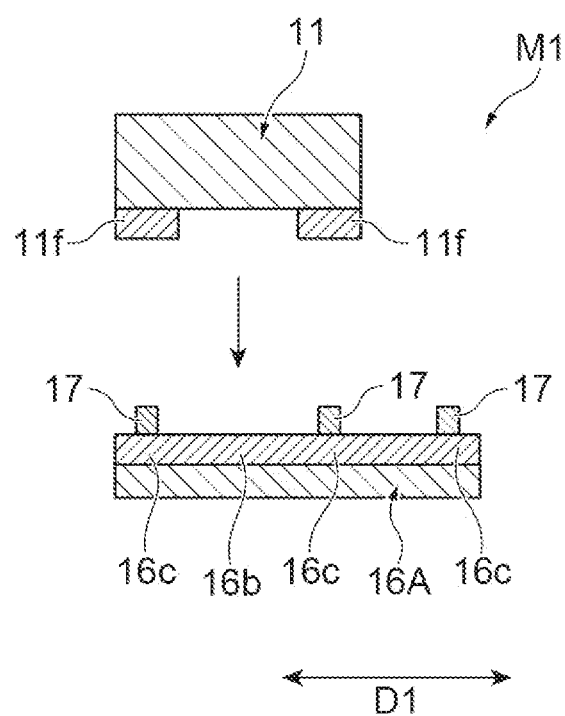
FIG. 16 is a side view of an interconnection board and a driver IC according to Modified Example.

It is noted that, as illustrated in FIG. 16, instead of the interconnection board 16, an interconnection board 16A of which length in the direction D1 is larger than a length of the driver IC 11 may be prepared. The number of bumps 17 bonded to the driver IC 11 on the interconnection board 16A can be two or more along the direction D1. As an example, the interconnection board 16A has three bumps 17 when viewed from the side in the direction D2, and two of the three bumps 17 are bonded to the driver IC 11. When assembling the driver IC 11 on the interconnection board 16A by flip-chip assembly, the stability of the flip-chip assembly can be further improved. It is noted that any of the bumps 17 bonded to the driver IC 11 may be dummy bumps (bumps used to ensure mechanical strength and do not contribute to electrical connection). The dummy bumps may be, for example, connected to the ground potential or electrically floating. It is noted that, when three or more bumps 17 are arranged along the direction D1 in this manner, the pads 16c may be provided not only at both ends of the electrical wiring 16b but also in the middle of the electrical wiring 16b. Alternatively, in FIG. 16, the three bumps 17 are formed on one electrical wiring 16b, but the left bump 17 in the figure may be formed to have a different electrical wiring from the electrical wiring on which the middle and right bumps 17 are formed.

Figure 4:
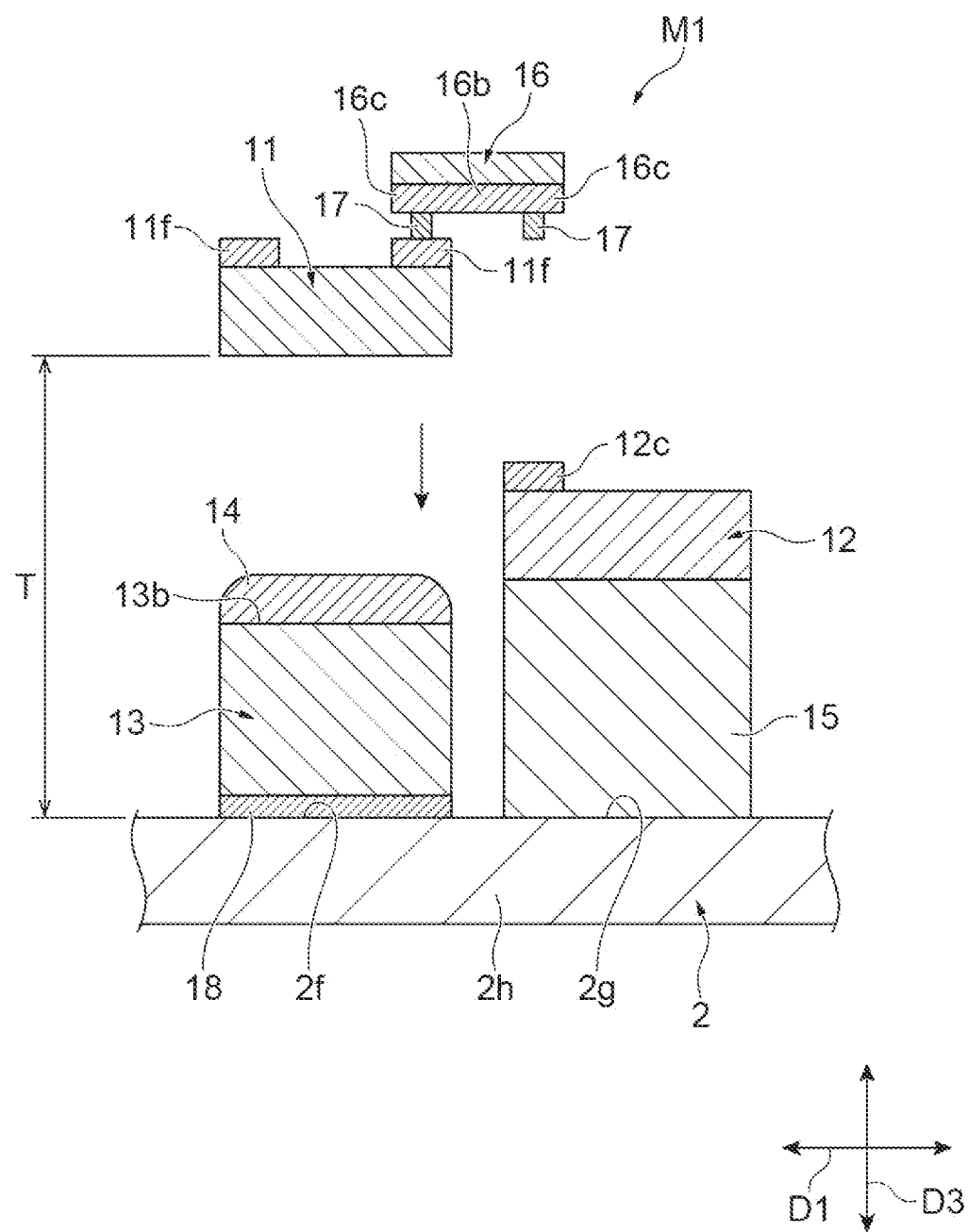
FIG. 4 is a view illustrating a process of the method of manufacturing the optical module according to the embodiment.

As illustrated in FIG. 4, the first heat radiation block 13 is bonded to the first face 2f of the housing 2 (heat radiation plate 2h) by the first adhesive 18 (the process of bonding the first heat radiation block). A paste that is cured by heating can be used as the first adhesive 18. That is, the first adhesive 18 is applied to the first face 2f, the first heat radiation block 13 is mounted thereon, and the first heat radiation block 13 is pressed toward the first face 2f, and after that, the first adhesive 18 may be cured by heating. The thickness of the first adhesive 18 after curing is, for example, 10 μm. A gold-tin solder may be used as the first adhesive 18. Next, the TEC 15 is mounted on the second face 2g of the housing 2 (heat radiation plate 2h) (the process of mounting the temperature control element). At this time, an adhesive (fourth adhesive) (not illustrated) is applied to the second face 2g, and after the TEC 15 is mounted thereon and is pressed against the first face 2f, the adhesive (not illustrated) may be cured by heating. In addition, the optical modulator 12 is bonded to the TEC 15 (the process of bonding the optical circuit element). Also at this time, the gold-tin solder may be used as an adhesive (not illustrated).

Then, the second adhesive 14 is applied to a face 13b of the first heat radiation block 13 opposite to the heat radiation plate 2h (the process of applying the second adhesive). For example, the volume of the second adhesive 14 applied at this time is larger than the volume of the first adhesive 18. It is noted that, herein, it is assumed that the area of the face 13b is equal to the area of the face bonded to the first face 2f of the first heat radiation block 13. More specifically, the thickness of the second adhesive 14 is larger than the thickness of the first adhesive 18 in the direction D3. In addition, the chip module M1 is held at a predetermined height T from the first face 2f and the second face 2g. The value of height T is larger than a value of the second distance K2. For example, the chip module M1 held at the height T may be located outside the housing 2 on which the second heat radiation block 13 and the TEC 15 are mounted. It is preferable that the process of applying the second adhesive is after the process of bonding the first heat radiation block, the process of mounting the temperature control element, and the process of bonding the optical circuit element.

Figure 5:
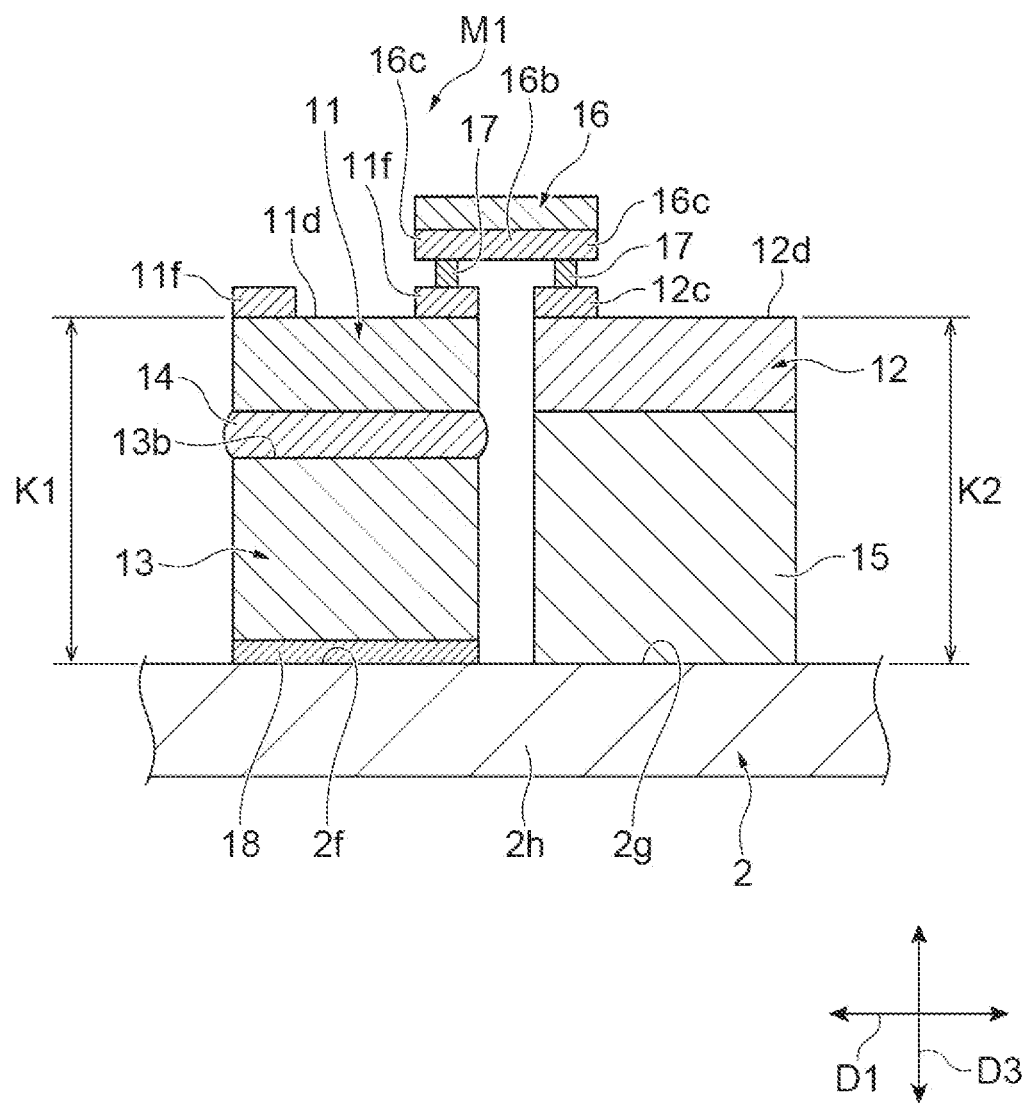
FIG. 5 is a view illustrating a process of the method of manufacturing the optical module according to the embodiment.

As illustrated in FIG. 5, the chip module M1 held at a predetermined height T is assembled on the optical modulator 12 by flip-chip assembly, and the driver IC 11 is pressed against the second adhesive 14 (pressing process). For example, downward pressure is applied to the second adhesive 14 through the driver IC 11. Accordingly, the driver IC 11 and the optical modulator 12 are electrically coupled through the interconnection board 16 while the difference between the first distance K1 and the second distance K2 is suppressed to be small. Then, the second adhesive 14 is cured by heating the second adhesive 14 (the process of curing the second adhesive).

It is noted that, after the process of pressing, the second adhesive remains uncured until the process of curing the second adhesive is completed. However, since the bonding between the bumps 17 and the pads 12c, and the bonding between the bumps 17 and the pads 16c have a sufficient bonding strength to maintain the connection state, for example, after the flip-chip assembly, the interconnection board 16 is prevented from being inclined with respect to the optical modulator 12, when the interconnection board 16 is connected to the optical modulator 12 with the bumps 17. For this reason, it is unlikely that the thickness of the second adhesive 14 will change significantly after the process of pressing until the process of curing the second adhesive is completed. Alternatively, the chip module M1 may be held by a holding tool in order to maintain the first distance K1 and suppress the change in the thickness of the second adhesive 14 during the curing. It is noted that, in order to reduce the inclination of the interconnection board 16, a periphery of the bumps 17 between the pads 12c and 16c may be filled with, for example, an underfill resin to reinforce the bump bonding.

Herein, the thickness of the driver IC 11 is, for example, 0.1 to 0.5 mm. The thickness of the optical modulator 12 is, for example, 0.1 to 0.5 mm. The thickness of the first heat radiation block 13 is, for example, 1.0 to 2.0 mm. The thickness of the TEC 15 is, for example, 1.0 to 2.0 mm. It is noted that these dimensions indicate the range of central values (design values). The actual thicknesses of these members have variations (manufacturing variation) in manufacturing with respect to the central value. The manufacturing variation depends on the configuration of each member, the manufacturing method, and the like. Therefore, when the sum of the thicknesses of the cured first adhesive 18, the first heat radiation block 13, and the driver IC 11 is set as a third distance K3, it is preferable that the thickness of the second adhesive 14 approximates a value obtained by subtracting the third distance K3 from the second distance K2 between the first face 2f and the fourth face 12d.

In addition, when considering the manufacturing variation in the thickness of each member described above, the maximum value of the thickness of the cured second adhesive 14 is equal to a value obtained by subtracting the minimum value of the third distance K3 from the maximum value of the second distance K2, and the minimum thickness of the cured second adhesive 14 is equal to a value obtained by subtracting the maximum value of the third distance K3 from the minimum value of the second distance K2. Furthermore, it is preferable that the thickness of the second adhesive 14 is set to have a value added with a margin so as to absorb the inclination between the upper face of the interconnection board 16 and the upper face of the driver IC 11 that may occur in the process of preparing the chip module M1, and the inclination between the upper face of the interconnection board 16 and the upper face of the optical modulator 12 that may occur in the process of pressing.

Finally, the thickness of the second adhesive 14 after the process of curing the second adhesive 14 (refer to FIG. 5) is, for example, 10 to 300 μm (when the thickness of the second adhesive 14 is not uniformed in-plane, the thickness of the thinnest portion is set as the thickness of the cured second adhesive 14). The minimum thickness of the cured second adhesive 14 is preferably 50 μm or less, but may be 40 μm or less, or may be even 30 μm or less. In addition, the minimum thickness may be 10 μm. It is noted that, in order to suppress the heat resistance of the second adhesive 14 to be low, it is preferable that the thickness of the second adhesive 14 is small. In the manner, by adjusting the thickness of the second adhesive 14 during the pressing process, the difference between the first distance K1 and the second distance K2 can be suppressed to be small, and more reliable connection of the interconnection board 16 to the driver IC 11 and the optical modulator 12 can be expected with respect to the manufacturing variation described above.

Figure 17:
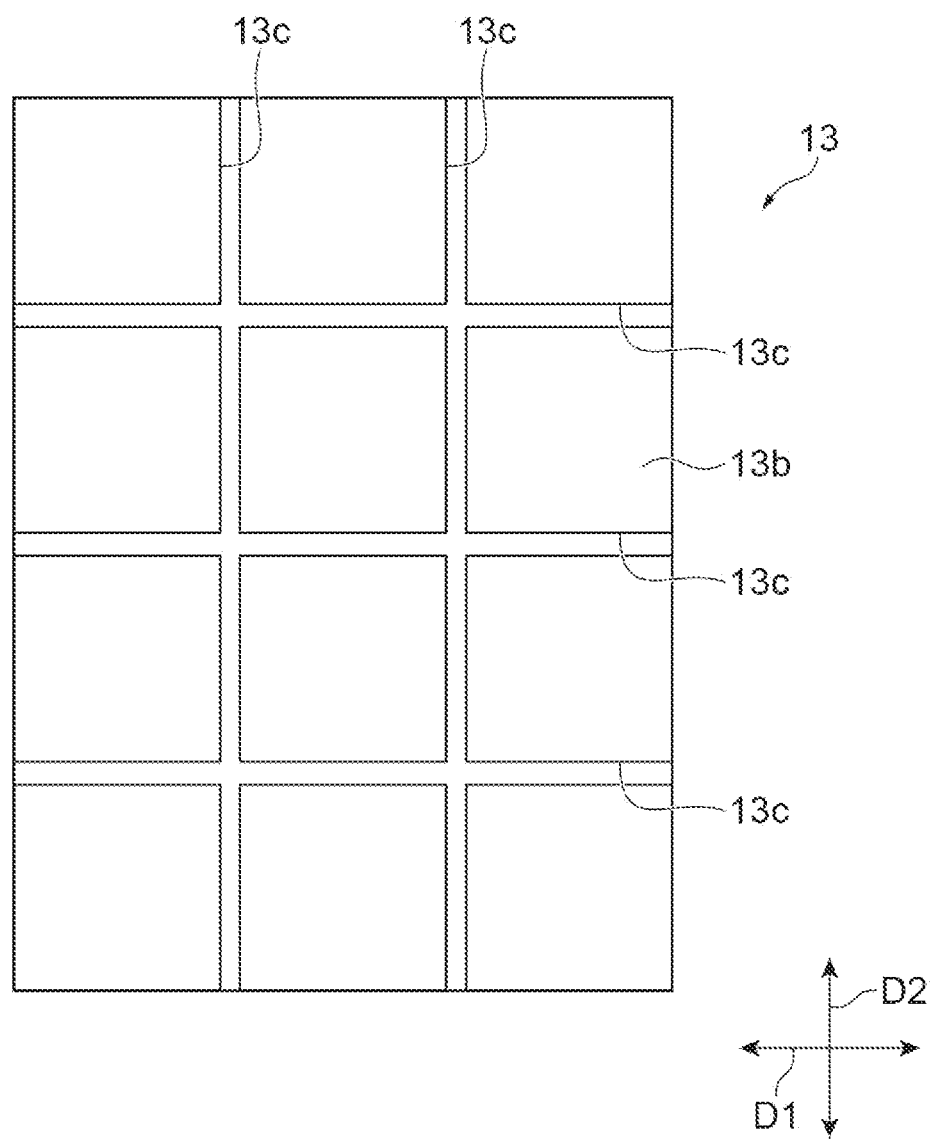
FIG. 17 is a plan view illustrating a structure of a heat radiation block of the optical module according to the embodiment.
Figure 18:
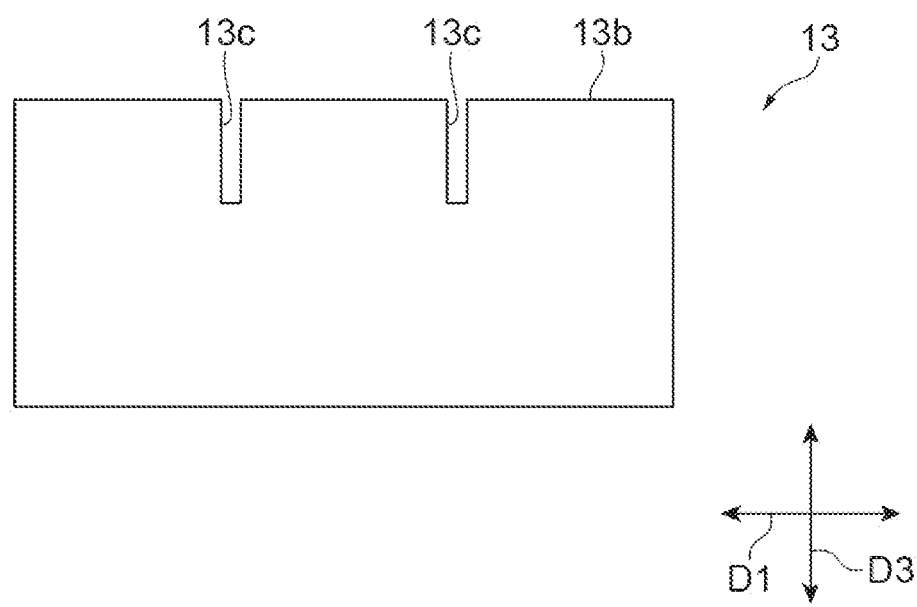
FIG. 18 is a side view illustrating the structure of the heat radiation block of the optical module according to the embodiment.
Figure 19:
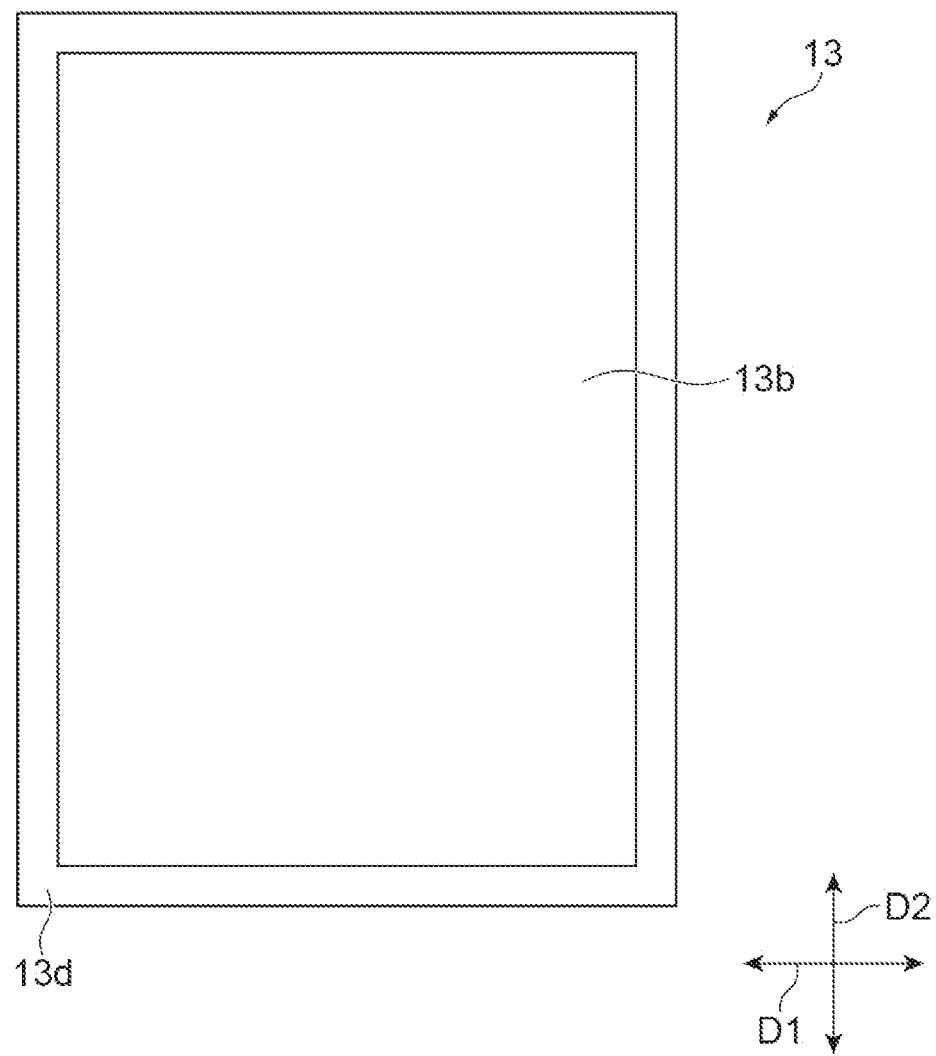
FIG. 19 is a plan view illustrating the structure of a heat radiation block of the optical module according to the embodiment.
Figure 20:
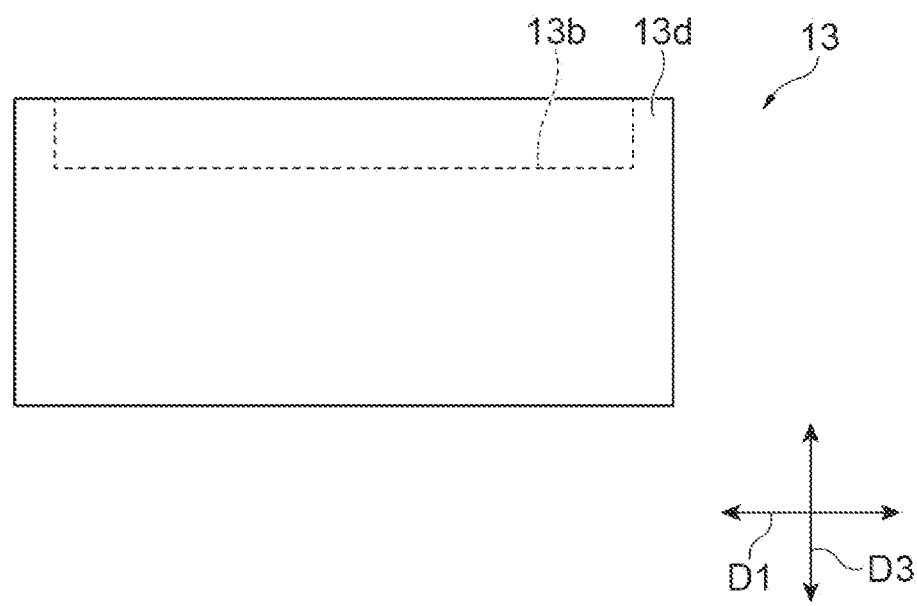
FIG. 20 is a side view illustrating the structure of the heat radiation block of the optical module according to the embodiment.

The amount of the second adhesive 14 to be applied in the process of applying the second adhesive is adjusted so that the thickness of the uncured second adhesive 14 after the application is, for example, 300 µm or more. In the case, as illustrated in FIGS. 17 and 18, a groove 13c may be formed on the face 13b of the first heat radiation block 13 to allow the excess second adhesive 14 to escape into the inside of the first heat radiation block 13 during the pressing process. In addition, as illustrated in FIGS. 19 and 20, an embankment wall 13d may be formed on the face 13b of the first heat radiation block 13 to prevent the excess second adhesive 14 from overflowing into the surroundings in the pressing process. In the configurations illustrated in FIGS. 2, 7, and 12, the groove 13c or the embankment wall 13d may prevent the excess second adhesive 14 extruded by the driver IC 11 in the pressing process from excessively protruding in the direction D1 or D2 and may prevent the excess second adhesive 14 from being in contact with, for example, the optical modulator 12 and the TEC 15. For example, the number of grooves 13c and the width and depth of each groove may be set according to the amount of the second adhesive 14 to be applied. In addition, the height of the embankment wall 13d relative to the face 13b may be set according to the amount of the second adhesive 14 to be applied. Before applying the second adhesive 14, the amount of the second adhesive 14 to be applied may be adjusted by detecting the difference in height between the face 13b of the first heat radiation block 13 and the fourth face 12d of the optical modulator 12 (also in consideration of the thickness of the driver IC 11). Herein, for example, even if the thickness of the second adhesive 14 is 300 µm, when the thermal conductivity of the second adhesive 14 is 10 W/(m·K), if the area of the driver IC 11 is, for example, 5 mm×3 mm, the thermal resistance of the second adhesive 14 becomes 2 K/W. At this time, even if the amount of heat generated by the driver IC 11 is, for example, 3 W, the temperature rise due to the thermal resistance of the second adhesive 14 can be suppressed to 6° C., and the operation temperature of the driver IC 11 can be suppressed within a predetermined range.

Next, the functions and effects obtained from the optical module 1 and the method of manufacturing the optical module according to the embodiment will be described. In the optical module 1 and the method of manufacturing the optical module according to the embodiment, the first heat radiation block 13 is placed on the first face 2f of the housing 2, and the TEC 15 is placed on the second face 2g of the housing 2. The interconnection board 16 is mounted on the driver IC 11 and the optical modulator 12.

A space between the driver IC 11 and the first heat radiation block 13 is filled with the second adhesive 14. The thickness of the second adhesive 14 is larger than the thickness of the first adhesive 18. By pressing the driver IC 11 against the second adhesive 14, the height (first distance K1) of the third face 11d of the driver IC 11 can approximate the height (second distance K2) of the fourth face 12d of the optical modulator 12 in the direction D3. Therefore, since the interconnection board 16 can be appropriately placed while the inclination is suppressed with respect to the driver IC 11 and the optical modulator 12, the interconnection board 16 can be reliably connected to the driver IC 11 and the optical modulator 12, respectively.

The interconnection board 16 may be mounted on the third face 11d of the driver IC 11 and on the fourth face 12d of the optical modulator 12. The thickness of the second adhesive 14 may be 10 µm or more. In the case, the interconnection board 16 can be more reliably connected to each of the driver IC 11 and the optical modulator 12.

The second adhesive 14 may be a silver paste. Accordingly, the heat resistance of the second adhesive 14 can be suppressed to be low, and the Joule heat generated by the driver IC 11 can be effectively released to the heat radiation plate 2h of the housing 2. It is noted that a conductive adhesive having a thermal conductivity of 10 W/(m·K) or more may be used instead of the silver paste.

The interconnection board 16 may be made of a material transmitting at least a portion of the wavelengths within the wavelength range of visible light. In the case, at least one of the driver IC 11, the optical modulator 12, and the second adhesive 14 can be visually recognized with the light transmitting through the interconnection board 16. For example, when there is a defect in each connection state, the defect can be detected by visual inspection. The visible light transmittance of the interconnection board 16 is preferably, for example, 50% or more.

The housing 2 may have the heat radiation plate 2h. The first face 2f and the second face 2g may be formed on the heat radiation plate 2h. In the case, the property of the heat radiation from each of the first heat radiation block 13 placed on the first face 2f and the TEC 15 placed on the second face 2g can be further enhanced.

The board of the interconnection board 16 may be made of a glass. In the case, the thermal resistance of the interconnection board 16 can be increased, and the heat inflow from the driver IC 11 to the optical modulator 12 can be reduced. Accordingly, the change in the optical characteristics of the optical modulator 12 can be reduced. In addition, the power consumption of the temperature control element 15 required to compensate for the temperature rise due to the heat inflow can be reduced.

The optical module 1 may include the second heat radiation block 19 contacted to the TEC 15. Accordingly, the second distance K2 between the first face 2f and the fourth face 12d can be allowed to easily approximate the first distance K1 between the first face 2f and the third face 11d according to the thickness of the TEC 15.

In the method of manufacturing the optical module according to the embodiment, in the above-described pressing process, the driver IC 11 be pressed against the uncured second adhesive 14 so that the height difference between the third face 11d of the driver IC 11 and the fourth face 12d of the optical modulator 12 is reduced. In the case, since the thickness of the uncured second adhesive 14 is 10 µm or more even in consideration of the manufacturing variation, the interconnection board 16 can be more reliably connected to each of the driver IC 11 and the optical modulator 12.

It is noted that the method of assembling the optical module 1 is not limited to the above method. For example, after the process of bonding the first heat radiation block, the process of mounting the temperature control element, and the process of bonding the optical circuit element, the process of applying the second adhesive is performed, and the single driver IC 11 is mounted on the second adhesive to cure the second adhesive by heating. When mounting the driver IC 11, it is preferable that the jig or device used for assembling the optical module 1 is controlled so that the height of the third face 11d of the driver IC 11 is approximately equal to the height of the fourth face 12d of the optical modulator 12. As a result, it is preferable that the difference between the first distance K1 between the first face 2*f* and the third face 11*d*, and the second distance K2 between the first face 2*f* and the fourth face 12*d* is 50 µm or less. After the second adhesive 14 is cured, the interconnection board 16 may be assembled on the third face 11*d* of the driver IC 11 and on the fourth face 12*d* of the optical modulator 12 by flip-chip assembly.

Alternatively, first, the chip module M1 may be prepared by assembling the driver IC 11 and the optical modulator 12 on the interconnection board 16 by flip-chip assembly (the process of preparing the chip module). In addition, after the process of bonding the first heat radiation block and the process of mounting the temperature control element, the second adhesive 14 is applied on the first heat radiation block 13, and the third adhesive may be also applied on the TEC 15 (the process of applying the second adhesive). By mounting the chip module M1 on the housing 2, the driver IC 11 may be pressed against the uncured second adhesive 14 toward the first heat radiation block 13, and the optical modulator 12 may be pressed against the uncured third adhesive (pressing process). Finally, the second adhesive 14 and the third adhesive may be heated to cure the second adhesive 14 and the third adhesive. The material constituting the third adhesive may be the same as or different from the material constituting the second adhesive 14. In the pressing process, the optical modulator 12 may be pressed against the third adhesive until the thickness of the third adhesive becomes sufficiently small. Accordingly, compared to the case where the optical modulator 12 is bonded to the TEC 15 in advance, the inclination of the driver IC 11 with respect to the face 13*b* of the first heat radiation block 13 can be suppressed, and the thickness of the second adhesive 14 can be made uniform.

Figure 6:
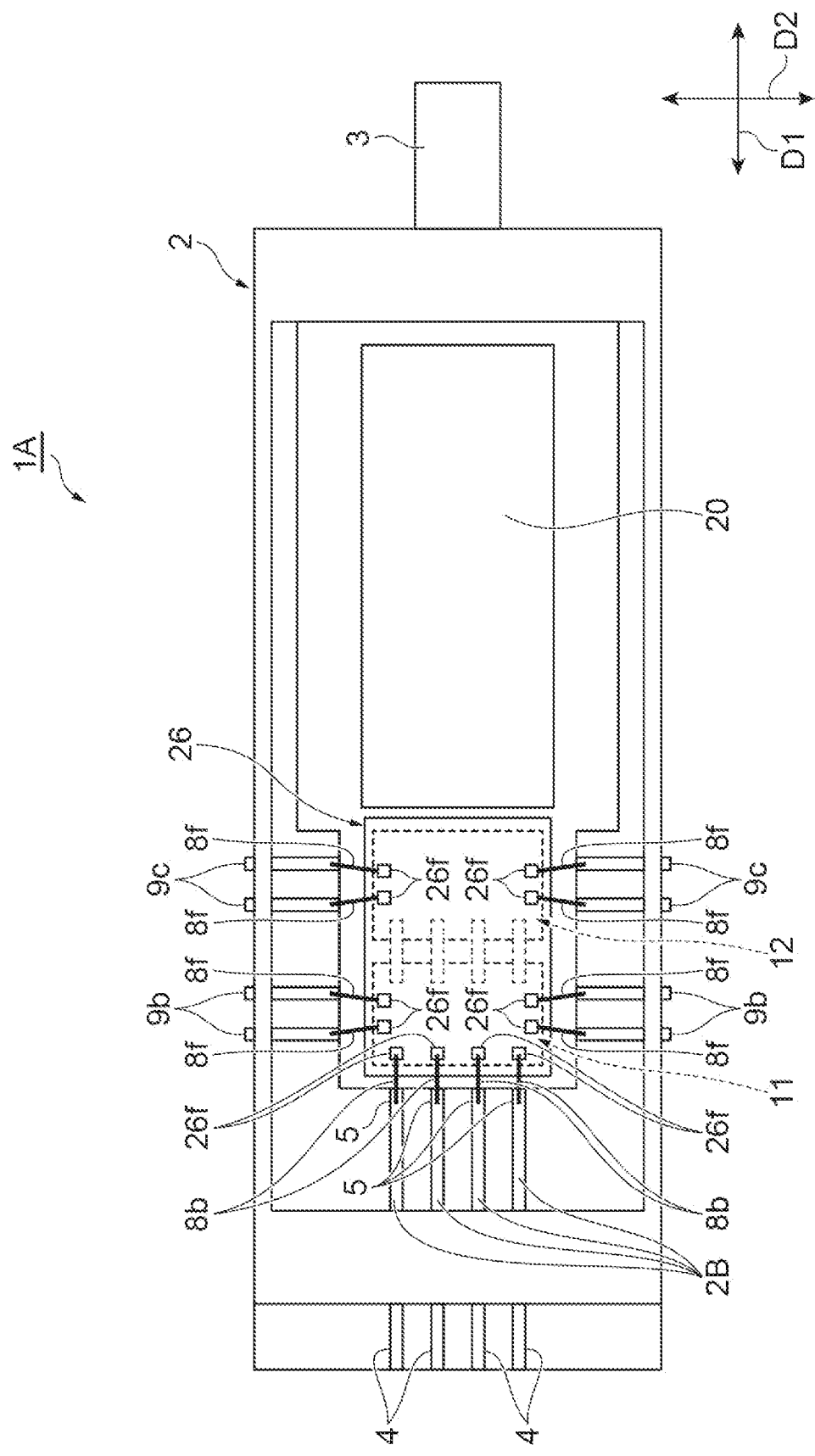
FIG. 6 is a plan view illustrating a structure of an optical module according to Modified Example 1.
Figure 7:
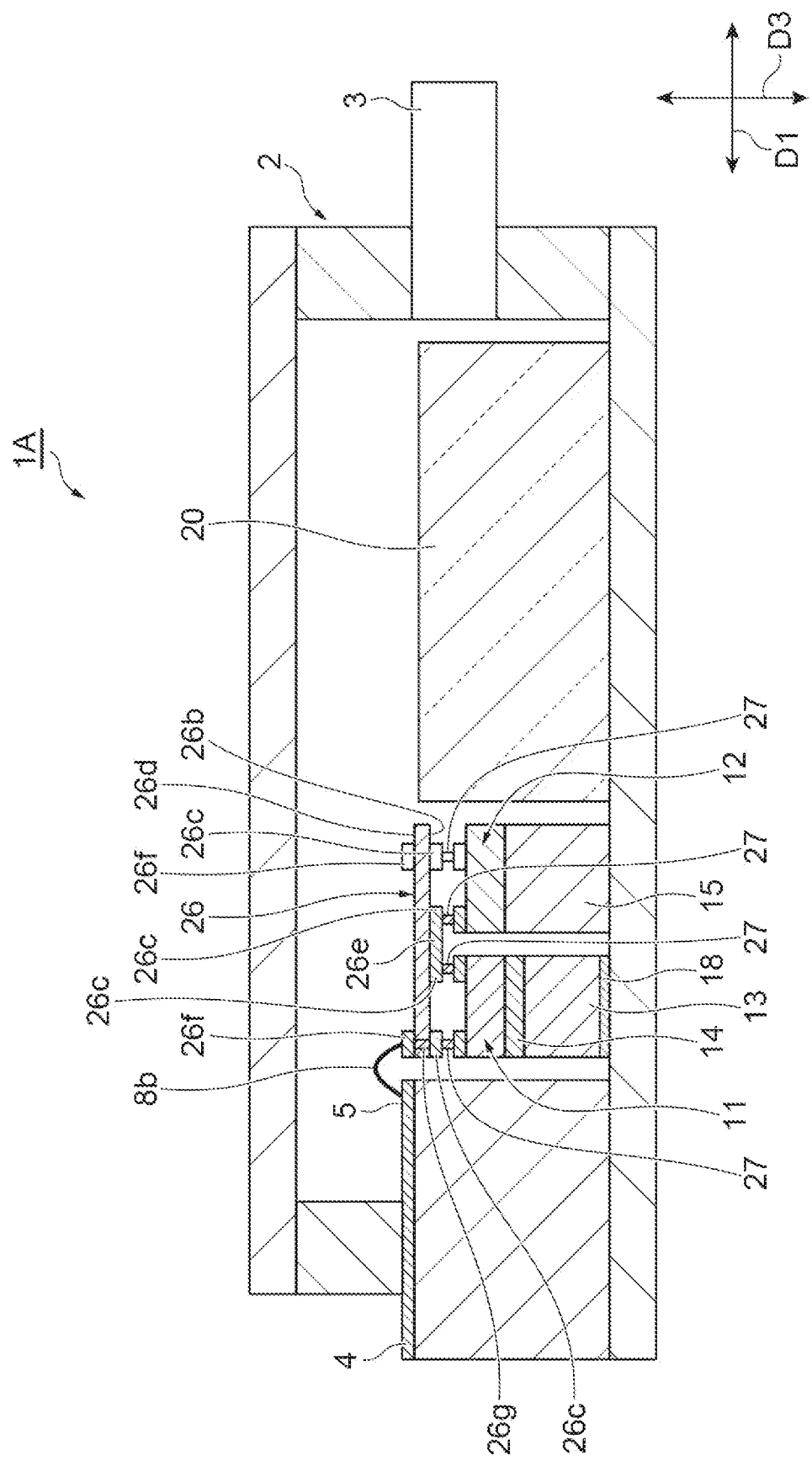
FIG. 7 is a longitudinal sectional view of the optical module according to Modified Example 1.

Next, an optical module 1A according to Modified Example 1 will be described with reference to FIGS. 6 and 7. FIG. 6 is a plan view illustrating a structure of the optical module 1A. FIG. 7 is a longitudinal sectional view of the optical module 1A. A portion of the configuration of the optical module 1A is the same as a portion of the configuration of the optical module 1 described above. Therefore, in the following description, the portions that overlap with the configuration of the optical module 1 are denoted by the same reference numerals, and the description thereof will be omitted as appropriate.

The optical module 1A has an interconnection board 26 that is larger than the interconnection board 16. When viewed along the direction D3, an area of the interconnection board 26 is larger than, for example, a sum of an area of the driver IC 11 and an area of the optical modulator 12. When viewed along the direction D3, the interconnection board 26 may be arranged, for example, so as to cover the driver IC 11 and the optical modulator 12. Therefore, the length of the interconnection board 26 in the direction D1 is larger than the length of the interconnection board 16 in the direction D1. A plurality of bumps 27 are formed on each of the driver IC 11 and the optical modulator 12. The interconnection board 26 has a face (circuit face) 26*b* facing the driver IC 11 and the optical modulator 12. An electrical wiring 26*e* is formed on the face 26*b* of the interconnection board 26, and a plurality of pads 26*c* are provided on the electrical wiring 26*e*. Each pad 26*c* is electrically coupled to the driver IC 11 or the optical modulator 12 through the bumps 27.

A plurality of pads 26*f* are provided on a face 26*d* of the interconnection board 26 opposite to the face 26*b*. The interconnection board 26 has vias 26*g* penetrating the interconnection board 26 along the direction D3 from the pads 26*f* to extend to the pads 26*c*. The via 26*g* is called a through-via or a penetrating-via and is called a TGV (Through Glass Via) especially when the interconnection board 26 is made of a glass. The pad 26*f* is electrically coupled to the pad 26*c* through the via 26*g*. Some of a plurality of the pads 26*f* are electrically coupled to the terminals 5 through the bonding wires 8*b*. A plurality of the remaining pads 26*f* are electrically coupled to the terminals 9*b* and 9*c* through bonding wires 8*f*. It is noted that, in FIG. 7, for simplification of illustration, some of the pads 26*c*, the bumps 27, and the pads 26*f* drawings are omitted. It is noted that the terminals 9*b* and 9*c* may be provided on only one of the pair of second side walls 2*c*. In FIG. 7, the pads 26*c* and the bumps 27 that are not hatched represent an example of the configuration of the dummy bumps. The dummy bumps are provided as necessary to reinforce the mechanical connection between the interconnection board 26 and the optical modulator 12. Since the dummy bumps are not used to transmit signals or configure circuits, the dummy bumps may be connected to the ground wiring or may be electrically floating.

Figure 8:
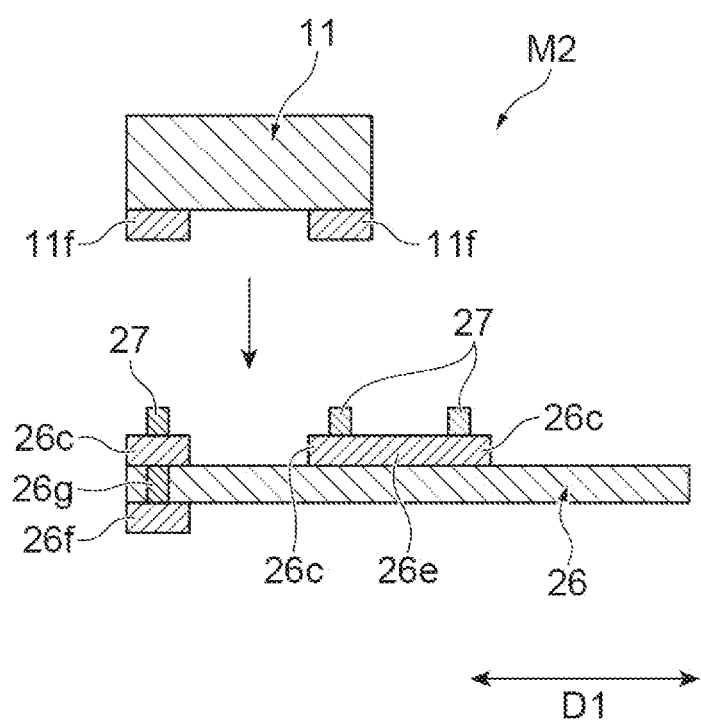
FIG. 8 is a view illustrating a process of a method of manufacturing an optical module according to Modified Example 1.

A method of manufacturing the optical module 1A according to Modified Example 1 will be described. First, as illustrated in FIG. 8, a chip module M2 is prepared by assembling the driver IC 11 on the interconnection board 26 arranged upward on an assembly jig (not illustrated) by flip-chip assembly (the process of preparing a chip module). At this time, the driver IC 11 is assembled on the interconnection board 26 by flip-chip assembly with the vias 26*g* in which the bumps 27 are fixed to the pads 26*c*. The bumps 27 are, for example, gold stud bumps made of Au. At this time, the bumps 27 formed on the pads 26*c* are bonded to the pads 11*f* of the driver IC 11. The bonding is performed, for example, by ultrasonic bonding or thermocompression bonding. It is noted that the bumps 27 may be formed on the pads 11*f* of the driver IC 11 and may be bonded to the pads 26*c* of the interconnection board 26.

Figure 9:
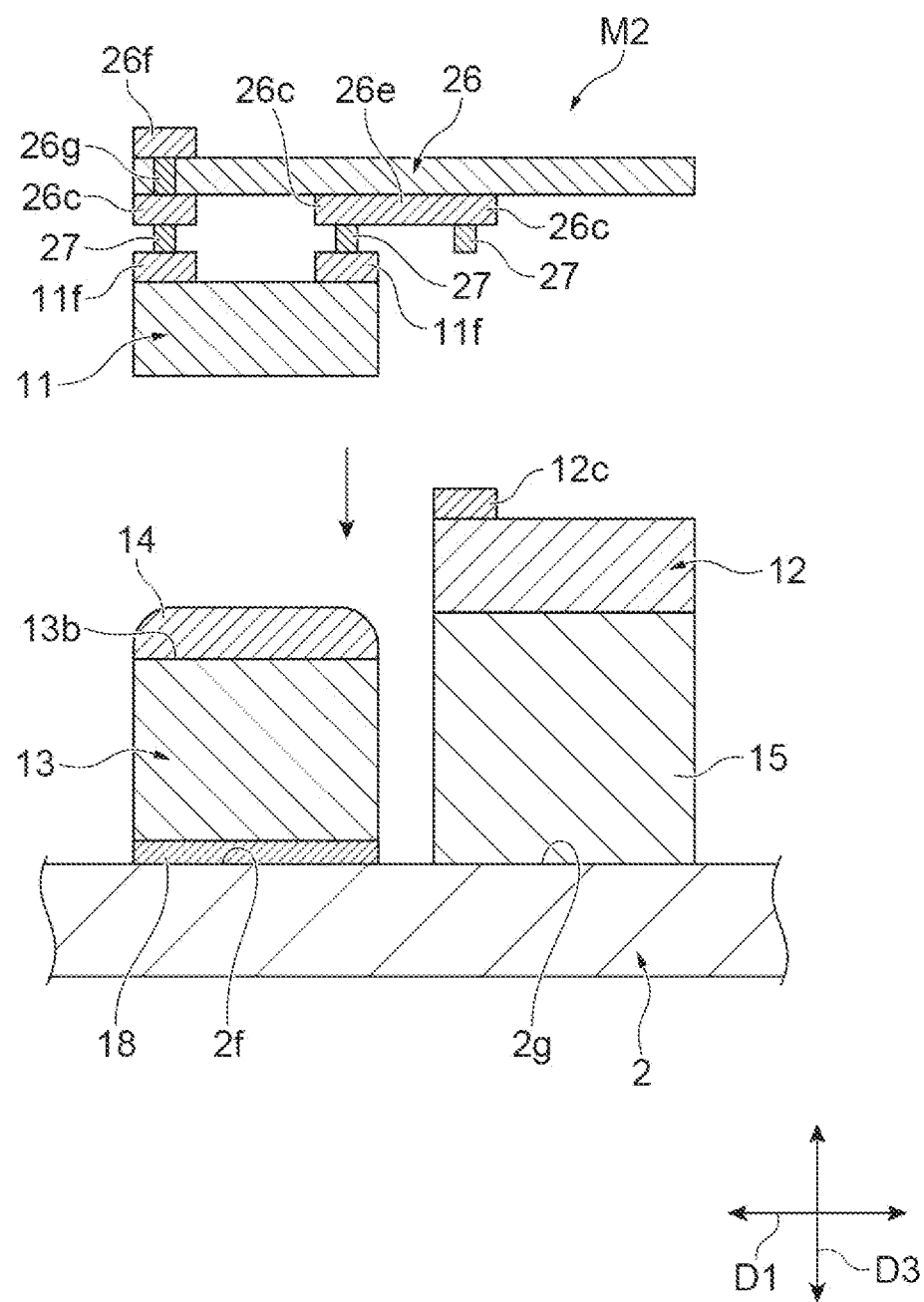
FIG. 9 is a view illustrating a process of the method of manufacturing the optical module according to Modified Example 1.

As illustrated in FIG. 9, the first heat radiation block 13 is bonded to the first face 2*f* of the housing 2 with the first adhesive 18 (the process of bonding the first heat radiation block), the TEC 15 is mounted on the second face 2*g* of the housing 2 (the process of mounting the temperature control element), and the optical modulator 12 is bonded to the TEC 15 (the process of bonding the optical circuit element). It is noted that adhesives are used to mount the TEC 15 on the second face 2*g* and to bond the optical modulator 12 to the TEC 15, but these are omitted from the drawing. As the adhesive, for example, gold-tin solder may be used. Then, the second adhesive 14 is applied to the face 13*b* of the first heat radiation block 13 (the process of applying the second adhesive).

Figure 10:
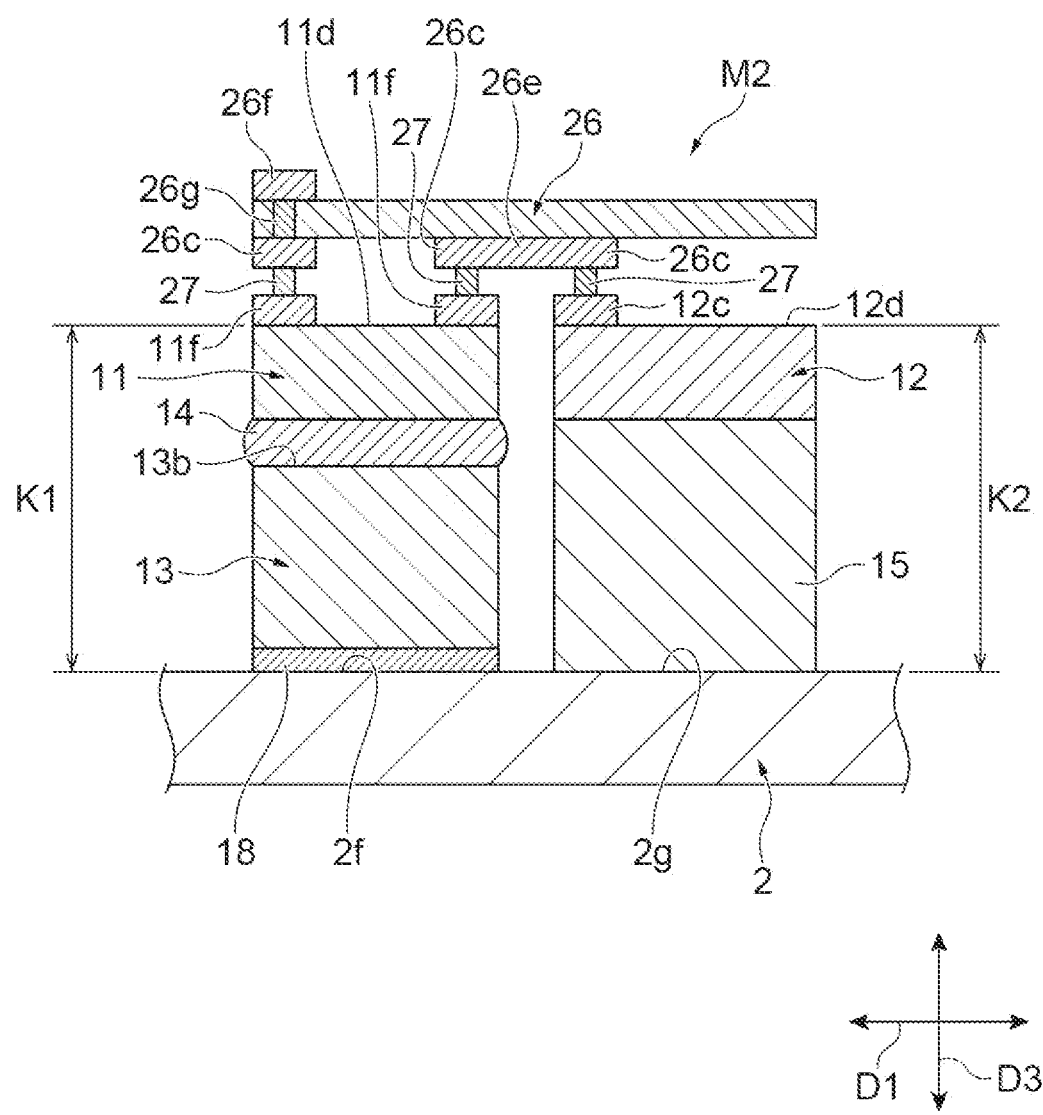
FIG. 10 is a view illustrating a process of the method of manufacturing the optical module according to Modified Example 1.

As illustrated in FIG. 10, the chip module M2 is assembled on the optical modulator 12 by flip-chip assembly, and the driver IC 11 is pressed against the second adhesive 14 (pressing process). Then, the second adhesive 14 is heated to cure the second adhesive 14 (the process of curing the second adhesive). It is noted that, in FIGS. 8, 9, and 10, the dummy bumps illustrated in FIG. 7 are omitted.

As described above, in the optical module 1A according to Modified Example 1, each of the driver IC 11 and the optical modulator 12 has a plurality of bumps 27 formed along the direction D1. The interconnection board 26 is connected to each of the driver IC 11 and the optical modulator 12 through the plurality of bumps 27. In the optical module 1A, since the interconnection board 26 has the plurality of bumps 27 and the interconnection board 26 is mounted so as to cover the driver IC 11 and the optical modulator 12, the connection of the interconnection board 26, and the driver IC 11 and the optical modulator 12 is reinforced, and the stability of individual bump connections can be improved. Since the interconnection board 26 has the plurality of bumps 27, the inclination between the upper face of the interconnection board 26 and the upper face of the driver IC 11 facing each other, and the inclination between the upper face of the interconnection board 26 and the upper face of the optical modulator 12 facing each other are hard to occur, and the interconnection board 26 can be more reliably connected to each of the driver IC 11 and the optical modulator 12. For example, by reducing the inclination, the stress exerted on the bonding between the individual bump and the pad can be distributed so as to be uniform.

Figure 11:
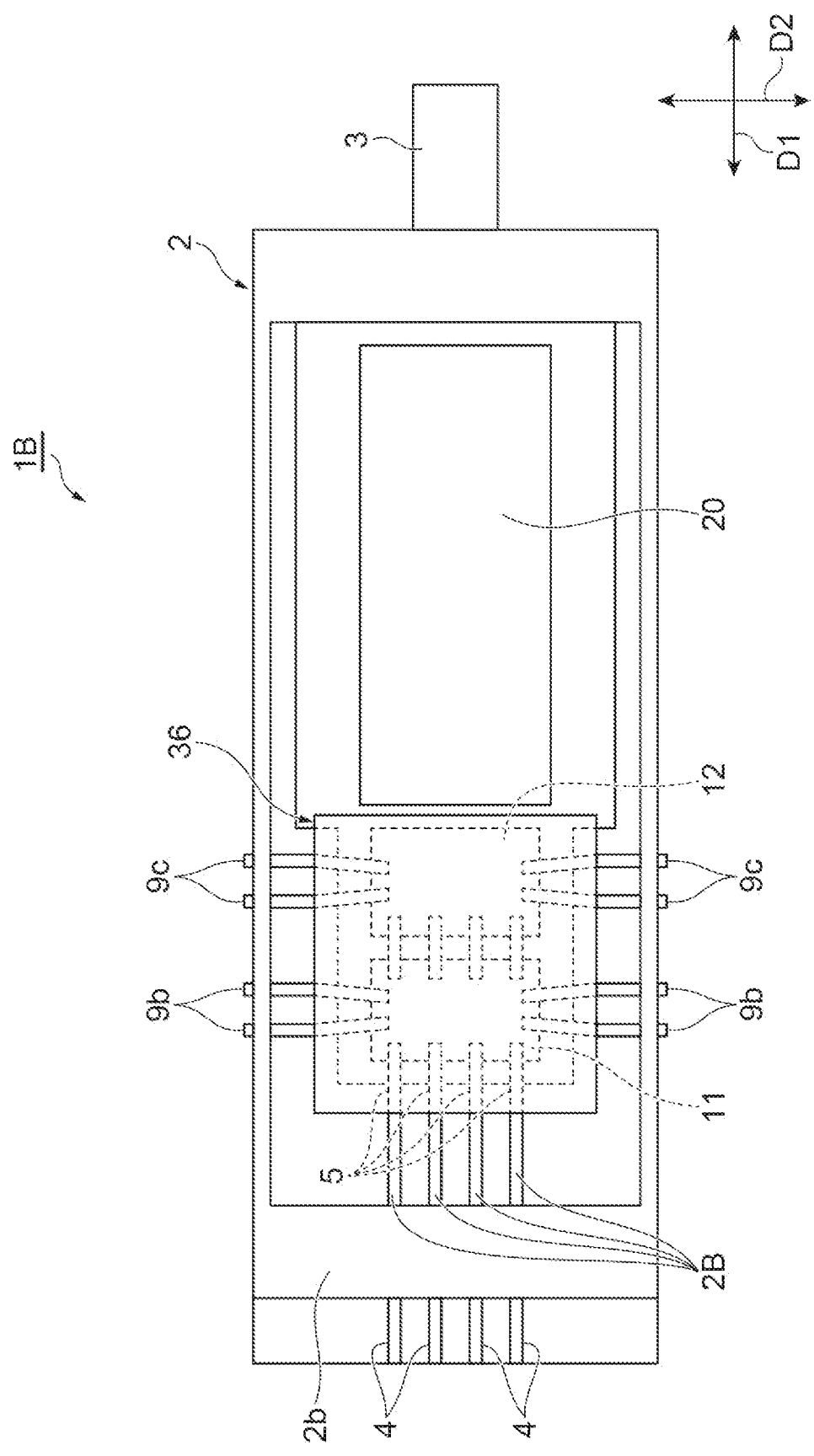
FIG. 11 is a plan view illustrating a structure of an optical module according to Modified Example 2.
Figure 12:
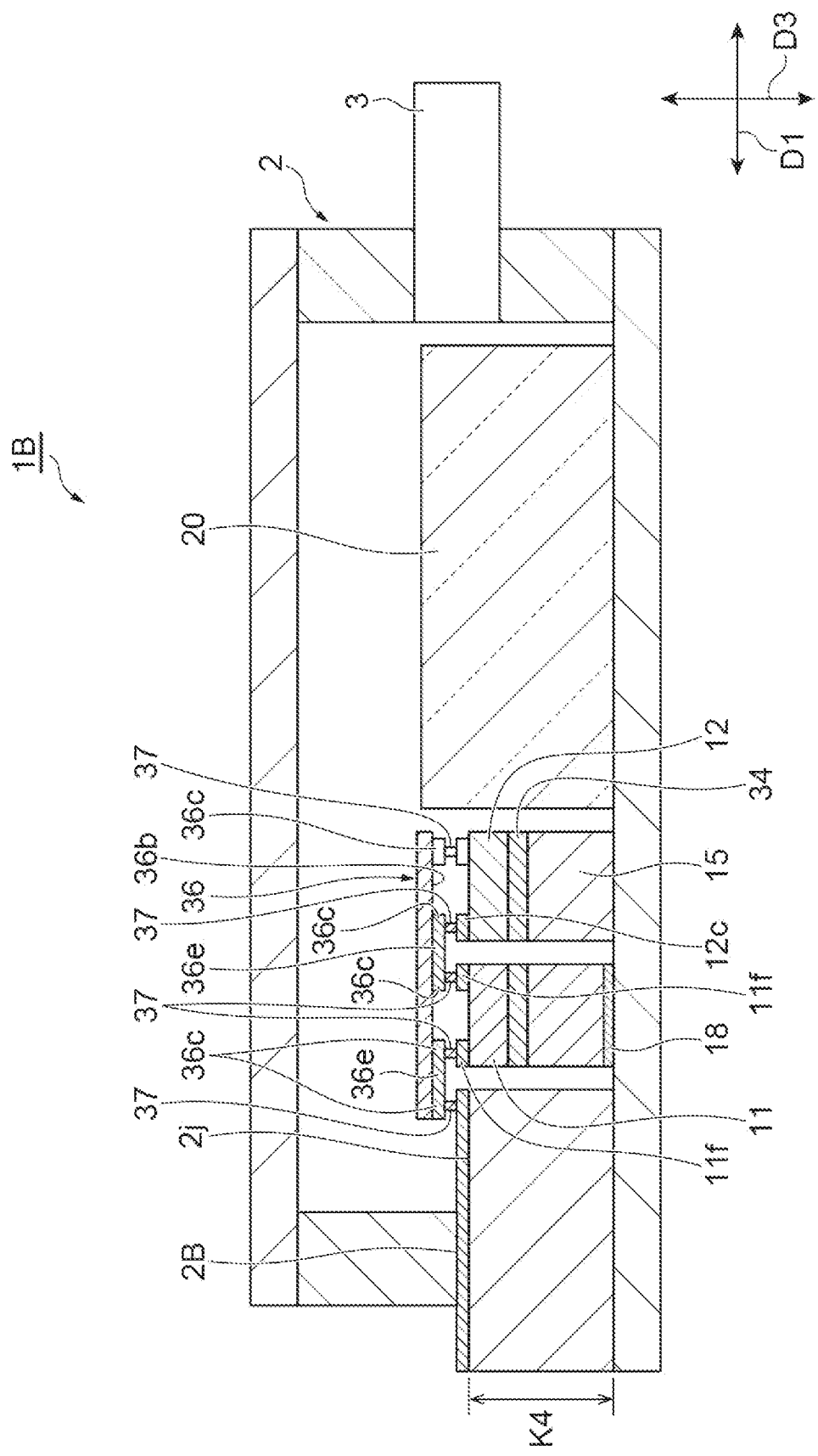
FIG. 12 is a longitudinal sectional view of the optical module according to Modified Example 2.

Next, an optical module 1B according to Modified Example 2 will be described with reference to FIGS. 11 and 12. FIG. 11 is a plan view illustrating the structure of the optical module 1B. FIG. 12 is a longitudinal sectional view of the optical module 1B. The optical module 1B has a third adhesive 34 filled between the TEC 15 and the optical modulator 12 and an interconnection board 36 which is even larger than the interconnection board 26. The third adhesive 34 is, for example, a silver paste. The third adhesive 34 is, for example, a paste when applied, but the third adhesive 34 is in a state of being cured by heating or the passage of time. The thermal conductivity in the cured state is, for example, preferably 1 W/(m·K) or more, more preferably 10 W/(m·K) or more. Accordingly, the thermal resistance of the third adhesive 34 can be suppressed to be low, and the difference between the temperature of the optical modulator 12 and the temperature of a face (temperature control face) 15b of the TEC 15 can be reduced within a predetermined range. As a result, by stabilizing the temperature of the optical modulator 12 against the change in external temperature, the change in optical characteristics of the optical modulator 12 can be reduced. The third adhesive 34 may have electrical conductivity as well as thermal conductivity. As the third adhesive 34, for example, an adhesive containing metal particles or ceramic fillers, a silicone-based adhesive, a paste containing metal nanoparticles such as gold, silver, or copper, a gold-tin alloy paste, or a solder paste (cream solder) may be used.

For example, the thickness of the third adhesive 34 is larger than the thickness of the first adhesive 18.

The interconnection board 36 is arranged so as to cover the driver IC 11 and the optical modulator 12 as well as a portion of the electrical wiring 2B of the housing 2 when viewed along the direction D3. The interconnection board 36 is assembled on the fifth face 2j of the housing 2 by flip-chip assembly. The interconnection board 36 can electrically couple the housing 2, the driver IC 11, and the optical modulator 12 to each other. Bumps 37 are formed on each of the driver IC 11, the optical modulator 12, and the electrical wiring 2B. The bumps 37 are, for example, gold stud bumps made of Au.

The interconnection board 36 has a face (circuit face) 36b facing the driver IC 11, the optical modulator 12, and the electrical wiring 2B. An electrical wiring 36e is formed on the face 36b of the interconnection board 36, and a plurality of pads 36c are provided on the electrical wiring 36e. Each pad 36c is electrically coupled to any one of the driver IC 11, the optical modulator 12, and the electrical wiring 2B through the bumps 37. It is noted that the optical module 1B does not have the bonding wires 8b (refer to FIG. 7) for electrically coupling the driver IC 11 and the terminals 4 of the electrical wiring 2B to each other. In FIG. 12, the pads 36c and the bumps 37 that are not hatched indicate an example of the configuration of the dummy bumps. The dummy bumps are provided as necessary to reinforce the mechanical connection between the interconnection board 36 and the optical modulator 12. Since the dummy bumps are not used to transmit signals or constitute circuits, the dummy bumps may be connected to the ground wiring or may be electrically floating.

Figure 13:
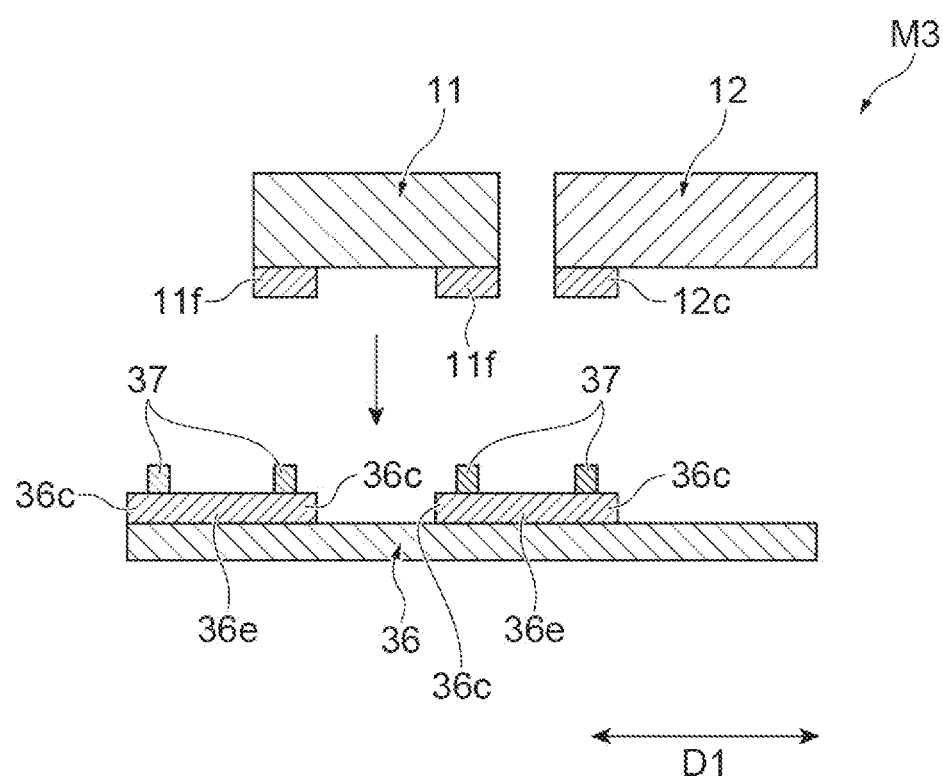
FIG. 13 is a view illustrating a process of a method of manufacturing the optical module according to Modified Example 2.

The method of manufacturing the optical module 1B will be described. First, as illustrated in FIG. 13, a chip module M3 is prepared by assembling the driver IC 11 and the optical modulator 12 on the interconnection board 36 arranged upward on an assembly jig (not illustrated) by flip-chip assembly (the process of preparing the chip module). At this time, the driver IC 11 and the optical modulator 12 are assembled on the interconnection board 36 having the bumps 37 formed on the pads 36c by flip-chip assembly. At this time, the bumps 37 formed on the pad 36c are bonded to any one of the pad 11f of the driver IC 11 and the pad 12c of the optical modulator 12. The bonding is performed, for example, by ultrasonic bonding or thermal compression bonding. It is noted that the bumps 37 may be formed on the pads 11f of the driver IC 11 and the pads 12c of the optical modulator 12 and may be bonded to the pads 36c of the interconnection board 36.

Figure 14:
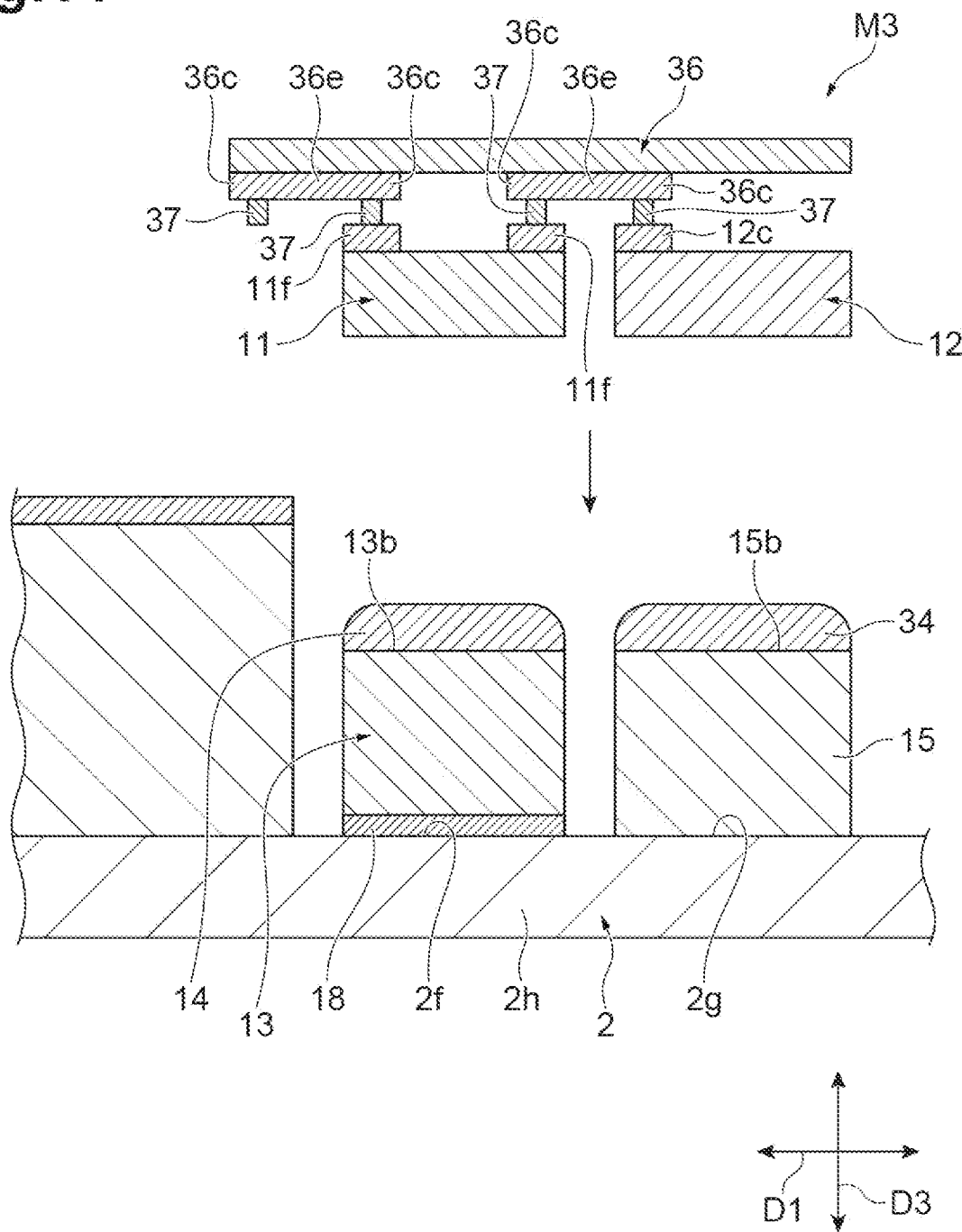
FIG. 14 is a view illustrating a process of the method of manufacturing the optical module according to Modified Example 2.

As illustrated in FIG. 14, the first heat radiation block 13 is bonded to the first face 2f of the housing 2 by the first adhesive 18 (the process of bonding the first heat radiation block), and the TEC 15 is mounted on the second face 2g of the housing 2 (the process of mounting the temperature control element). The second adhesive 14 is applied to the face 13b of the first heat radiation block 13 (the process of applying the second adhesive). Then, the third adhesive 34 is applied to the face 15b of the TEC 15 facing the other side from the housing 2 (in particular, the heat radiation plate 2h).

Figure 15:
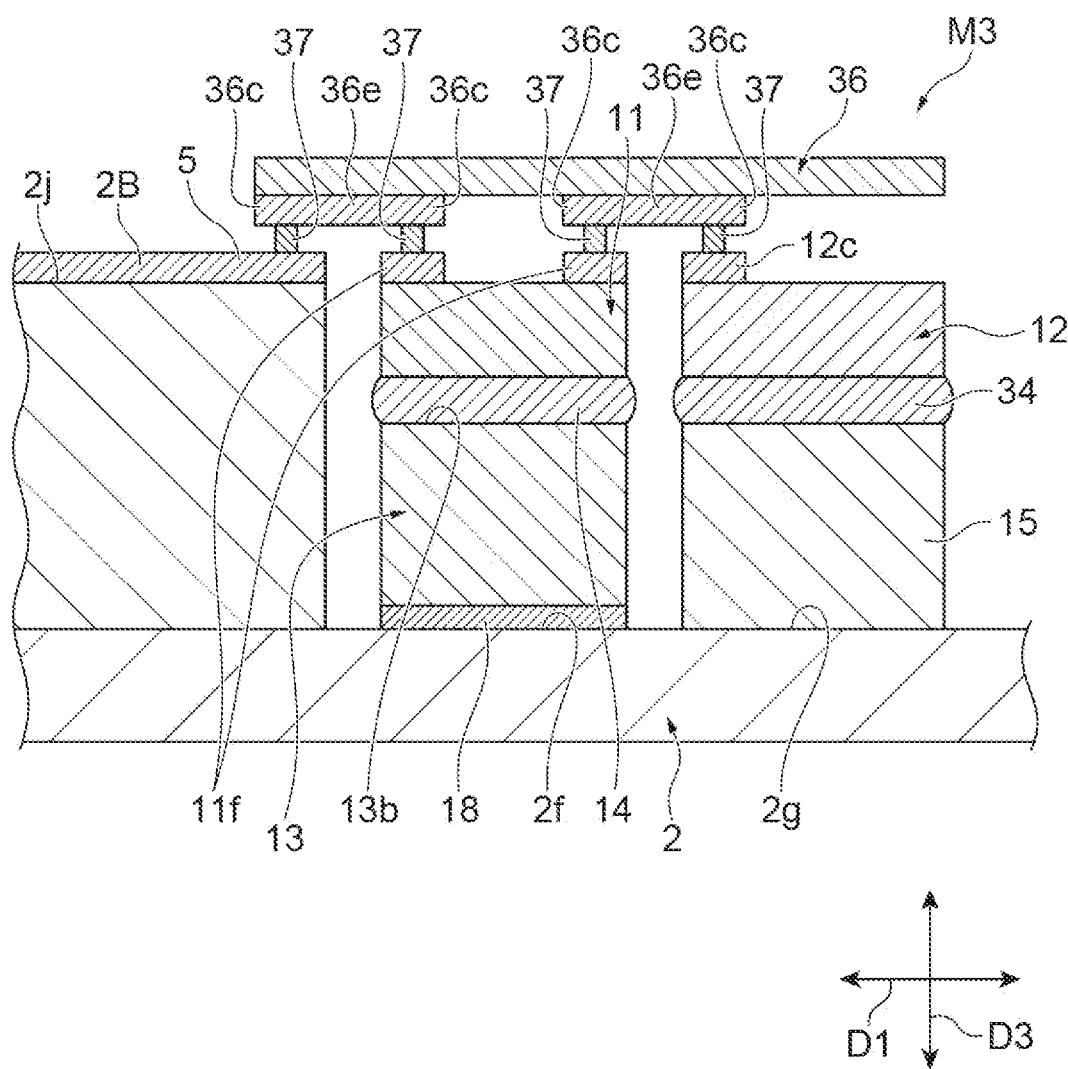
FIG. 15 is a view illustrating a process of the method of manufacturing the optical module according to Modified Example 2.

As illustrated in FIG. 15, the chip module M3 is mounted on the terminals 5 of the electrical wiring 2B, the optical modulator 12 is pressed against the third adhesive 34, and the driver IC 11 is pressed against the second adhesive 14 (pressing process). Then, the second adhesive 14 and the third adhesive 34 are heated to cure the second adhesive 14 and the third adhesive 34 (the process of curing the second adhesive). It is noted that, in FIGS. 13, 14, and 15, the dummy bumps illustrated in FIG. 12 are omitted.

Herein, a fourth distance (indicated by K4) between the fifth face 2j and the first face 2f of the housing 2 is, for example, 1.5 to 2.5 mm. The thickness of the driver IC 11 is, for example, 0.1 to 0.5 mm. The thickness of the optical modulator 12 is, for example, 0.1 to 0.5 mm. The thickness of the first heat radiation block 13 is, for example, 1.0 to 2.0 mm. The thickness of the TEC 15 is, for example, 1.0 to 2.0 mm. It is noted that these dimensions indicate the range of central values (design values). The actual thicknesses of these members have variations (manufacturing variation) in manufacturing with respect to the central value. The manufacturing variation depends on the configuration of each member, the manufacturing method, and the like. Therefore, when the sum of the thicknesses of the cured first adhesive 18, the first heat radiation block 13, and the driver IC 11 is set as a third distance K3, it is preferable that the thickness of the cured second adhesive 14 approximates a value obtained by subtracting the third distance K3 from the fourth distance K4 between the fifth face 2j and the first face 2f of the housing 2. Similarly, when the sum of the thicknesses of the TEC 15 and the optical modulator 12 is set as a fifth distance K5, it is preferable that the thickness of the cured third adhesive 34 approximates a value obtained by subtracting the fifth distance K5 from the fourth distance K4 between the fifth face 2j and the first face 2f of the housing 2. It is noted that, the fifth distance K5 may include a thickness of the adhesive used when mounting the TEC 15 on the second face 2g of the housing 2.

In addition, when considering the manufacturing variation in the thickness of the members described above, the maximum thickness of the cured second adhesive 14 is a value obtained by subtracting the minimum value of the third distance K3 from the maximum value of the fourth distance K4, and the minimum thickness of the cured second adhesive 14 is equal to a value obtained by subtracting the maximum third distance K3 from the minimum fourth distance K4. Similarly, the maximum thickness of the third adhesive 34 is equal to a value obtained by subtracting the minimum fifth distance K5 from the maximum fourth distance K4, and the minimum thickness of the third adhesive 34 is equal to a value obtained by subtracting the maximum value of the fifth distance K5 from the minimum value of the fourth distance K4. Furthermore, it is preferable that the thickness of the second adhesive 14 may be added with a margin so as to absorb the inclination between the upper face of the interconnection board 16 and the upper face of the driver IC 11 that may occur in the process of preparing the chip module, and the inclination between the upper face of the interconnection board 16 and the first face 2f that may occur in the pressing process. Similarly, it is preferable that the thickness of the third adhesive 34 may be added with a margin so as to absorb the inclination between the upper face of the interconnection board 16 and the upper face of the optical modulator 12 that may occur in the process of preparing the chip module, and the inclination between the upper face of the interconnection board 16 and the first face 2f that may occur in the pressing process.

When the assembly of the optical module M3 is finally completed, the thickness of the second adhesive after the process of curing the second adhesive (refer to FIG. 15) is, for example, 10 to 100 μm (when the thickness of the second adhesive is not uniform in the plane, the thickness of the thinnest portion is set as the thickness of the second adhesive). The thickness of the third adhesive after the process of curing the second adhesive is, for example, 10 to 300 μm (when the thickness of the third adhesive is not uniform in the plane, the thickness of the thinnest portion is set as the thickness of the third adhesive). The thickness variation of the third adhesive is larger than that of the second adhesive, generally, because the thickness variation of the TEC 15 is large. The minimum thickness of the cured second adhesive 14 is preferably 50 μm or less, but may be 40 μm or less, or may be even 30 μm or less. Alternatively, the minimum thickness may be 10 μm. It is noted that, in order to suppress the heat resistance of each of the second adhesive and the third adhesive to be low, it is preferable that the thickness of each of the second adhesive and the third adhesive is small during the curing. In the manner, by adjusting the thickness of each of the second adhesive and the third adhesive during the pressing process, the connection between the interconnection board 16 and the housing 2, the connection between the interconnection board 16 and the driver IC 11, and the connection between the interconnection board 16 and the optical modulator 12 are formed more stably with respect to the manufacturing variation described above.

In the optical module 1B, since the interconnection board 16 is mounted on the electrical wiring 2B of the housing 2, the difference between the first distance K1 between the first face 2f of the housing 2 and the third face 11d of the driver IC 11, and the second distance K2 between the first face 2f and the fourth face 12d of the optical modulator 12 is likely to be small. Accordingly, the connection between the interconnection board 16 and the housing 2, the connection between the interconnection board 16 and the driver IC 11, and the connection between the interconnection board 16 and the optical modulator 12 are formed more stably.

As described above, in the optical module 1B according to Modified Example 2, the housing 2 has the fifth face 2j parallel to the first face 2f, and the interconnection board 36 is assembled on the fifth face 2j by flip-chip assembly. The interconnection board 36 can electrically couple the housing 2, the driver IC 11, and the optical modulator 12 to each other, and a space between the TEC 15 and the optical modulator 12 is filled with the third adhesive 34. Therefore, the electrical wiring 2B of the housing 2 and the driver IC 11 can be electrically coupled to each other through the electrical wiring 36b formed on the interconnection board 36. Therefore, by transmitting an electric signal (drive signal) through the transmission line formed by the electrical wiring 36b, the bonding wire 8b from the housing 2 to the driver IC 11 can be allowed to be unnecessary, and thus, the parasitic inductance is suppressed, and the characteristic of the high frequency of the drive signal can be made even better.

Heretofore, the embodiments and various modifications according to the present disclosure have been described. However, the present invention is not limited to the above-described embodiments or various modifications, and can be appropriately changed within the scope of spirit of the claims. In addition, the optical module according to the present disclosure may be a combination of a plurality of examples of the above-described embodiments, Modified Example 1, and Modified Example 2. For example, in the above-described embodiments, the optical module 1, which is an optical transmitter module, has been described. However, the optical module may not be an optical transmitter module, but may be, for example, an optical receiver module.

For example, in the optical receiver module, a trans-impedance amplifier IC (TIA) instead of the driver IC in the configuration of FIG. 2, a light reception element PD instead of the optical modulator 12, a first block instead of a first heat radiation block 13, and a second block instead of the TEC may be used. In addition, materials with low thermal conductivity may be used for the first adhesive 18 and the second adhesive 14. With such a configuration, a reception signal (for example, photocurrent) generated by the light reception element PD can be transmitted to the TIA through the interconnection board 16. Parasitic inductance can be reduced by transmitting the electrical signals through the transmission line formed on the interconnection board 16, and the reception performance of the optical receiver module can be improved. The first block and the second block may be made of an insulating material. In addition, the first adhesive and the second adhesive may each have an insulating property.

Hereinafter, the configuration of the optical module according to the embodiment will be listed again as additional notes.

APPENDIX

An optical module including:
a housing having a first face and a second face parallel to the first face;
a trans-impedance IC mounted on the first face via a first block;

a light reception element mounted on the second face via a second block;

an interconnection board mounted on the trans-impedance IC and the light reception element and electrically coupled to the trans-impedance IC and the light reception element, wherein the first block is bonded to the first face by a first adhesive, wherein the trans-impedance IC is bonded to the first block by a second adhesive, and wherein the second adhesive has a thickness larger than a thickness of the first adhesive.

What is claimed is:

1. An optical module comprising:
    a housing having a first face and a second face parallel to the first face;
    a first block fixed to the first face of the housing by a first adhesive;
    an integrated circuit (IC) fixed to the first block by a second adhesive having a thickness larger than a thickness of the first adhesive;
    a thermoelectric cooler (TEC) fixed to the second face of the housing;
    an optical circuit element fixed to the TEC; and
    an interconnection board mounted on the IC and the optical circuit element, the interconnection board being configured to electrically couple the IC to the optical circuit element;
    wherein the first block is sandwiched between the housing and the IC, and
    wherein the TEC is sandwiched between the housing and the optical circuit element.

2. The optical module according to claim 1,
    wherein the IC has a third face opposite to the first block,
    wherein the optical circuit element has a fourth face opposite to the TEC,
    wherein the interconnection board is mounted on the third face of the IC and the fourth face of the optical circuit element, and
    wherein the second adhesive has a thickness of 10 micrometers or more.

3. The optical module according to claim 1,
    wherein the second adhesive is silver paste.

4. The optical module according to claim 1,
    wherein the interconnection board allows visible light to transmit through the interconnection board.

5. The optical module according to claim 1,
    wherein the housing has a fifth face parallel to the first face,
    wherein the interconnection board is further mounted on the fifth face and electrically couples the housing to one of the IC and the optical circuit element, and
    wherein the optical module further includes a third adhesive between the TEC and the optical circuit element.

6. The optical module according to claim 1,
    wherein the housing includes a heat radiation member and the heat radiation member has the first face and the second face.

7. The optical module according to claim 1,
    wherein the IC has a plurality of bumps the optical circuit element has a plurality of bumps,
    wherein the interconnection board is electrically coupled to the IC through one of the bumps of the IC, and
    wherein the interconnection board is electrically coupled to the optical circuit element through one of the bumps of the optical circuit element.

8. The optical module according to claim 1,
    wherein the interconnection board is constituted of glass.

9. The optical module according to claim 1, further comprising a second block touching the TEC.

10. A manufacturing method of an optical module comprising:
    bonding a first block to a first face of a housing by a first adhesive;
    mounting a thermoelectric cooler (TEC) on a second face of the housing;
    preparing a chip module by assembling an integrated circuit (IC) on an interconnection board by flip-chip assembly;
    applying a second adhesive on the first block bonded on the first face of the housing, the second adhesive having a thickness larger than a thickness of the first adhesive;
    mounting an optical circuit element on the TEC mounted on the second face of the housing;
    pressing the IC against the second adhesive and mounting the chip module on the optical circuit element by flip-chip assembly, after holding the chip module at a predetermined height from one of the first face and the second face; and
    curing the second for bonding the IC to the first block.

11. A manufacturing method of an optical module comprising:
    bonding a first block to a first face of a housing by a first adhesive;
    mounting a thermoelectric cooler (TEC) on a second face of the housing;
    preparing a chip module by assembling an integrated circuit (IC) and an optical circuit element on an interconnection board by flip-chip assembly;
    applying a second adhesive on the first block bonded on the first face of the housing, the second adhesive having a thickness larger than a thickness of the first adhesive;
    applying a third adhesive on the TEC mounted on the second face of the housing;
    pressing the IC against the second adhesive and simultaneously pressing the optical circuit element against the third adhesive, after holding the chip module at a predetermined height from one of the first face and the second face; and
    curing the second adhesive and the third adhesive for bonding the chip module to the first block and the TEC.

* * * * *